(12) United States Patent
Naito et al.

(10) Patent No.: US 10,177,383 B2
(45) Date of Patent: Jan. 8, 2019

(54) NANO-COATING MATERIAL, METHOD FOR MANUFACTURING SAME, COATING AGENT, FUNCTIONAL MATERIAL, AND METHOD FOR MANUFACTURING SAME

(71) Applicant: NATIONAL INSTITUTE FOR MATERIALS SCIENCE, Ibaraki (JP)

(72) Inventors: Masanobu Naito, Ibaraki (JP); Debabrata Payra, Ibaraki (JP); Sachiko Hiromoto, Ibaraki (JP); Alok Singh, Ibaraki (JP)

(73) Assignee: NATIONAL INSTITUTE FOR MATERIALS SCIENCE, Ibaraki (JP)

( * ) Notice: Subject to any disclaimer, the term of this patent is extended or adjusted under 35 U.S.C. 154(b) by 0 days.

(21) Appl. No.: 15/129,911

(22) PCT Filed: Mar. 30, 2015

(86) PCT No.: PCT/JP2015/060000
§ 371 (c)(1),
(2) Date: Sep. 28, 2016

(87) PCT Pub. No.: WO2015/152176
PCT Pub. Date: Oct. 8, 2015

(65) Prior Publication Data
US 2017/0214047 A1    Jul. 27, 2017

(30) Foreign Application Priority Data

Mar. 31, 2014 (JP) ................. 2014-072029
Jun. 18, 2014 (JP) ................. 2014-125143

(51) Int. Cl.
*H01M 4/62* (2006.01)
*H01M 4/68* (2006.01)
(Continued)

(52) U.S. Cl.
CPC .............. *H01M 4/622* (2013.01); *B05D 1/18* (2013.01); *B05D 7/14* (2013.01); *C08F 20/18* (2013.01);
(Continued)

(58) Field of Classification Search
CPC ...... H01M 4/622; H01M 4/628; H01M 4/661; H01M 10/0525; B05D 1/18; B05D 7/14; C23F 15/00; C09D 133/26
See application file for complete search history.

(56) References Cited

U.S. PATENT DOCUMENTS

2008/0169059 A1    7/2008  Messersmith et al.
2009/0215925 A1    8/2009  Urban et al.
(Continued)

FOREIGN PATENT DOCUMENTS

CN    101704914    5/2010
CN    102372817    3/2012
(Continued)

OTHER PUBLICATIONS

Stepuk et al., "Mussel-inspired load bearing metal-polymer glues", Chemical Communications, 48(50): 6238-6240, 2012.
(Continued)

*Primary Examiner* — Brittany L Raymond
(74) *Attorney, Agent, or Firm* — Wenderoth, Lind & Ponack, L.L.P.

(57) ABSTRACT

A nano-coating material, capable of being bonded to the surface of a metal or an alloy substrate, the nano-coating material includes a compound having, in a polymer main chain, (A) a first side chain or a terminal, each having a binding group containing a benzene ring having at least one pair of adjacent hydroxyl groups; and (B) a functional second side chain.

20 Claims, 49 Drawing Sheets

(51) Int. Cl.

| | | |
|---|---|---|
| *H01M 10/0525* | (2010.01) | |
| *B05D 7/14* | (2006.01) | |
| *B05D 1/18* | (2006.01) | |
| *C09D 133/26* | (2006.01) | |
| *C23F 15/00* | (2006.01) | |
| *C09D 133/04* | (2006.01) | |
| *C09D 201/00* | (2006.01) | |
| *H01M 4/66* | (2006.01) | |
| *C08F 20/18* | (2006.01) | |
| *C08F 20/56* | (2006.01) | |
| *C08F 20/58* | (2006.01) | |
| *C08F 220/18* | (2006.01) | |
| *B05D 5/08* | (2006.01) | |

(52) U.S. Cl.
CPC ............... *C08F 20/56* (2013.01); *C08F 20/58* (2013.01); *C08F 220/18* (2013.01); *C09D 133/04* (2013.01); *C09D 133/26* (2013.01); *C09D 201/00* (2013.01); *C23F 15/00* (2013.01); *H01M 4/628* (2013.01); *H01M 4/661* (2013.01); *H01M 4/667* (2013.01); *H01M 10/0525* (2013.01); *B05D 1/185* (2013.01); *B05D 5/08* (2013.01); *B05D 2202/00* (2013.01)

(56) References Cited

U.S. PATENT DOCUMENTS

2011/0076504 A1* 3/2011 Van De Weerdt .... C08F 220/34
428/463
2012/0078296 A1 3/2012 Lee
2012/0196175 A1* 8/2012 Hida .................. H01M 10/052
429/162
2013/0029369 A1 1/2013 Adkins et al.

FOREIGN PATENT DOCUMENTS

| CN | 102504082 | 6/2012 |
|---|---|---|
| GB | 2495951 | 5/2013 |
| JP | 10-29292 | 2/1998 |
| JP | 2012-72440 | 4/2012 |
| JP | 2012-216347 | 11/2012 |
| JP | 2012-233059 | * 11/2012 |
| WO | 03/008376 | 1/2003 |
| WO | 2005/118831 | 12/2005 |
| WO | 2009/147007 | 12/2009 |

OTHER PUBLICATIONS

Yabu et al. "Thermal nanoimprint lithography of polymer films on non-adhesive substrates by using mussel-inspired adhesive polymer layers", Journal of Materials Chemistry C, 1(8): 1558-1561, 2013.
Kokalj et al., "What Determines the Inhibition Effectiveness of ATA, BTAH, and BTAOH Corrosion Inhibitors on Copper?", Journal of The American Chemical Society, 132: 16657-16668, 2010.
Lee et al., "Mussel-Inspired Surface Chemistry for Multifunctional Coatings", Science, 318(5849): 426-430, 2007.
International Search Report dated Apr. 28, 2015 in corresponding International Application No. PCT/JP2015/060000.
Communication pursuant to Article 94(3) EPC dated Jun. 26, 2018 in corresponding European patent application No. 15 772 382.6.
Extended European Search Report dated Aug. 1, 2017 in corresponding European patent application No. 15 772 382.6.
Notification of Reasons for Refusal dated Sep. 12, 2017 in Japanese patent application No. 2016-511896, with Machine Translation.

* cited by examiner

DOMA-$C_1$

DOMA-C$_6$

DOMA-C$_{12}$ (a) Uncoated  (b) Coated

Figure: Schematic diagram of H₂ evolution

NANO-COATING MATERIAL, METHOD FOR MANUFACTURING SAME, COATING AGENT, FUNCTIONAL MATERIAL, AND METHOD FOR MANUFACTURING SAME

TECHNICAL FIELD

The present invention relates to a nano-coating material, a method for producing the same, a coating agent, a functional material, and a method for producing the functional material.

BACKGROUND ART

Metals such as magnesium (Mg), aluminum (Al), titanium (Ti) and copper (Cu), alloys containing those metals as main components, and steel containing iron (Fe) as a main component, are utilized as structural material components appropriate for engineering applications.

For example, Mg among these is an element that is abundant in the earth's surface, and is known to be a metal that can be used for engineering applications, is light, has high toughness per unit mass, has high vibration absorbability, is non-toxic, and has satisfactory castability. Therefore, Mg is an important metal that is utilized in industrial application and daily goods. In fact, Mg is used in automotive wheels, aircraft parts, mobile telephone components, and the like.

However, metal elements such as Mg described above are reaction-active substances, and readily react with water molecules, halide ions including chloride ions, or the like in air or in water to be oxidized. Through this oxidation reaction, these materials have a problem that rust containing the reaction active substances as main components is generated and deteriorates durability. For example, when Mg is immersed in an acidic solution, an alkaline solution, or saline, Mg immediately undergoes a chemical reaction represented by the following chemical formula (1), and is corroded along with the generation of hydrogen.

[Chemical Formula 1]

$$Mg \rightarrow Mg^{n+} + ne^-$$
$$2nH^+ + 2ne^- \rightarrow nH_2 \uparrow \quad \quad (1)$$

Such an oxidative deterioration reaction becomes particularly problematic when a non-noble metal such as Mg is used as a structural material. In the case of an Al alloy or steel, since the oxide film produced on the alloy surface works as a passivation film, oxidation of the alloy matrix itself can be prevented. On the other hand, since a Mg alloy or the like has high corrosion activity, it is difficult to produce a stable passivation film.

Therefore, in order to suppress corrosion reactions, antirust coating materials that protect the surface of metal substrates such as Mg and Mg alloys, and the like have been hitherto developed to enhance anti-rust properties.

For example, there has been suggested a method for producing a corrosion resistant iron material having high antirust properties and durability thereof, without using or including any chromium-based compounds that have antirust properties but are hazardous (Patent Literature 1). In this case, the corrosion resistant iron material is coated with an antirust coating composition that includes a compound having at least one phenolic hydroxyl group in the molecule and a silane compound as essential components. However, in Patent Literature 1 of the prior art, the composition was not applied to magnesium alloys, which have high corrosion tendency and are not very effective to anti-corrosion technologies.

In the case of copper alloys, it has been traditionally known that nitrogen-containing aromatic compounds such as benzotriazole exhibit superior performance as corrosion inhibitors (Non-Patent Literature 1). It is considered that when such a corrosion inhibitor is used, non-covalent bonds are formed between the atoms at the metal surface and the ligand present in corrosion inhibitor, and finally the nitrogen-containing aromatic compound molecules form a two-dimensional polymer network in atomic level, so that an antirust effect can be obtained thereby. That is, it is disclosed that, as a result of the metal-ligand interaction in atomic level and the corrosion inhibitor compactly and completely covering the surface of the metal substrate, hydrogen, chlorine, water and the like are effectively removed, and consequently, the nitrogen-containing aromatic compounds exhibit high anti-corrosion properties for copper and copper alloys.

However, the antirust effect of such a nitrogen-containing aromatic compound is a phenomenon limited to copper and copper alloys, and an organic coating agent which exhibits an antirust effect irrespective of the kind of metal has not yet been developed.

Furthermore, a surface-treated metal plate that does not contain any hexavalent chromium, which imposes high environmental toxicity, and exhibits excellent corrosion resistance, solvent resistance, alkali resistance and adhesiveness to top coat materials, and a method for producing the surface-treated metal plate have been suggested (Patent Literature 2). In the surface-treated metal plate of this case, a surface treating agent containing an organic resin having an anionic functional group is applied on the surface of the metal plate or the like, and after heating and drying, a surface treatment coating film is formed through contact with an aqueous solution containing a metal cation such as $Mg^{2+}$.

However, the antirust effect of these conventional antirust coating materials and the like was not sufficient in any of the cases. Furthermore, in the case of using these antirust coating materials, a coating agent must be developed and produced for each kind of metal or alloy or each composition, and the operation was complicated. Moreover, in a case in which such an antirust coating material was used, if a thick film having a thickness of about several dozen μm was not formed, it was difficult to secure the adhesive power for a metal, or to prevent penetration of water or halide ions through cracks of the coating film. Therefore, in a case in which antirust coating is applied to a finely processed product that uses an alloy, using these antirust coating materials, there occurs a problem that the delicate processing is impaired. For this reason, there is an increasing demand for a "nano-coating material" which exhibits a high antirust effect even if a film having a small thickness in the order of nanometers.

Furthermore, a nano-coating material having excellent adhesive power for a metal is expected to be applicable to an antirust coating material, as well as various applications such as, for example, a coating agent for an electrode of a battery.

CITATION LIST

Patent Literatures

Patent Literature 1: JP 2004-197151 A
Patent Literature 2: JP 2009-249690 A

Non-Patent Literatures

Non-Patent Literature 1: Anton Kokalj, Sebastijan Peljhan, Matjaz Finsgar, and Ingrid Milosev, Journal of The American Chemical Society, 2010, 132, 16657.
Non-Patent Literature 2: H. Lee, S. M. Dellatore, W. M. Miller, and P. B. Messersmith, Science, 2007, 318, 426.

SUMMARY OF INVENTION

Technical Problem

Objective of the present invention is to solve the conventional problems such as described above, and to provide a new nano-coating material which can be applied easily, can be conveniently produced and prepared, and has excellent adhesiveness to a metal or an alloy even if the film thickness is thin; a method for producing the nano-coating material; a coating agent; a functional material; and a method for producing the functional material. Particularly, it is an object of the invention to provide a nano-coating material which also has an excellent antirust effect in addition to the adhesiveness to a metal, an alloy or the like.

Solution to Problem

The nano-coating material of the present invention is characterized by the following.
(1) A nano-coating material, capable of being bonded to the surface of a metal or an alloy substrate,
the nano-coating material includes a compound having, in a polymer main chain,
(A) a first side chain or a terminal, each having a binding group containing a benzene ring having at least one pair of adjacent hydroxyl groups; and
(B) a functional second side chain.
(2) The second side chain is hydrophobic.
(3) The second side chain is hydrophilic.
(4) The polymer main chain is a polymer chain including carbon (C) single bonds.
(5) The polymer main chain is formed from a copolymer of acrylamide and an acrylate.
(6) The binding group of the first side chain includes a catechol group.
(7) The second side chain has an alkyl group having a number of carbon atoms (C) of from 1 to 12.
(8) The second side chain has a functional group containing a benzene ring.
The method for producing a nano-coating material of the present invention is characterized by the following.
(9) A method for producing a nano-coating material capable of being bonded to the surface of a metal or an alloy, the method includes:
a polymerization step for polymerizing a first monomer having a binding group containing a benzene ring having at least one pair of adjacent hydroxyl groups, and a second monomer having a hydrophobic group or a hydrophilic group.
(10) The first monomer has a methacryalmide group.
(11) The second monomer has a methacrylate group.
(12) The methacrylamide group has a hydroxyl group or an alkyl group having a number of carbon atoms (C) of from 1 to 12.
(13) The acrylate group has a hydroxyl group or an alkyl group having a number of carbon atoms (C) of from 1 to 12.
(14) The hydrophobic group includes an alkyl group having a number of carbon atoms (C) of from 1 to 12, or a benzene ring.
(15) In the polymerization step, the first monomer and the second monomer are polymerized by a thermal reaction using AIBN as a polymerization initiator.
(16) A coating agent of the present invention is for a substrate formed from a metal or an alloy, the coating agent including the nano-coating material.
The functional material of the present invention is characterized by the following.
(17) The nano-coating material is bonded to the surface of a substrate formed from a metal or an alloy.
(18) A nano-coating film is formed on the surface of the substrate through bonding of the nano-coating material, and the film thickness of the nano-coating film is 100 nm or more and less than 1 μm.
(19) The substrate is a lithium ion battery electrode.
The method for producing a functional material of the present invention
(20) A method for producing a functional material includes:
a step of dispersing the nano-coating material in an organic solvent, and preparing a nano-coating material dispersion liquid; and
a step of applying the nano-coating material dispersion liquid on a substrate surface by a wet coating method, subsequently drying the dispersion liquid, and thereby bonding the nano-coating material to the substrate surface.

Advantageous Effects of Invention

The nano-coating material of the present invention can be dispersed in an organic solvent and then can be applied easily, uniformly and smoothly by a wet coating method, and binding groups that are capable of coordination bonding to metal atoms can strongly adhere the coating film to a metal surface. Particularly, in a case in which the second side chain is hydrophobic, hydrophobic groups can prevent penetration of water molecules to the surface of a substrate formed from a metal or an alloy. Therefore, a nano-coating material which is capable of forming a coating film having a high antirust effect even if the film thickness is thin, is provided.

Furthermore, the nano-coating material of the present invention can be used as, for example, a binder for a lithium ion battery electrode.

Furthermore, according to the method for producing a nano-coating material of the present invention, a nano-coating material that has, in a polymer main chain, a side chain having a binding group formed from a benzene ring having at least one pair of adjacent hydroxyl groups, and has a functional second side chain, can be produced conveniently and easily with high yield.

Regarding the functional material of the present invention, binding groups of a nano-coating film obtained from the coating material described above are strongly adhered by being coordinately bonded to metal atoms at the surface of a substrate formed from a metal or an alloy. Particularly, in a case in which the second side chain is hydrophobic, since hydrophobic groups prevent access of water molecules to the substrate surface, even if the film thickness of the coating film is small in a nano-scale, an excellent antirust effect is obtained, and the surface of a substrate of a metal, an alloy or the like can be reliably stably protected.

In the method for producing a functional material of the present invention, as the method includes a step for dispersing the nano-coating material described above in an organic solvent, and preparing a coating material dispersion liquid; and a step for applying the coating material dispersion liquid on a substrate surface by a wet coating method, subsequently drying the dispersion liquid, and thereby forming a nano-coating film on the substrate surface, even if the film thickness is very small in a nano-scale, binding groups capable of coordinate bonding to metal atoms can strongly adhere the nano-coating film to a metal surface. Particularly, in a case in which the second side chain is hydrophobic, a functional material in which hydrophobic groups can prevent approach of water molecules to the surface of a substrate formed from a metal or an alloy, can be easily obtained.

DESCRIPTION OF EMBODIMENTS

Figure 1:
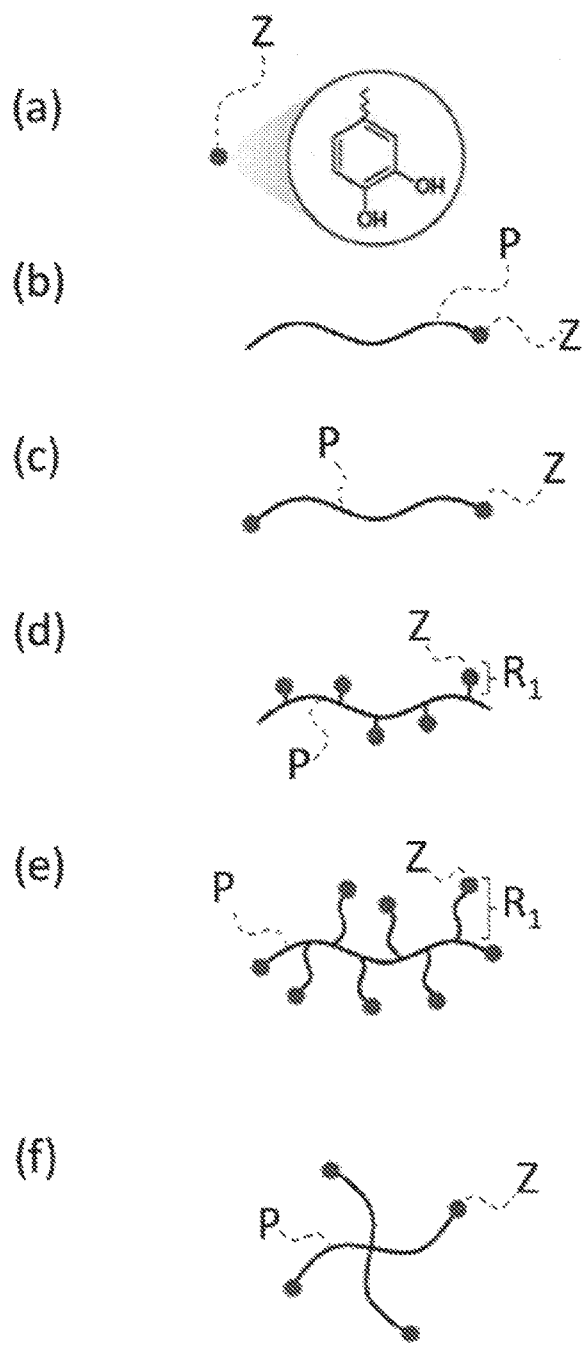
FIGS. 1(a) to 1(f) are outline explanatory diagrams for the chemical structure of a nano-coating material according to an embodiment of the present invention.

The nano-coating material of the present invention is a nano-coating material that is bonded to the surface of a substrate formed from a metal or an alloy, and the nano-coating material is formed from a compound which has, in a polymer main chain, (A) a first side chain or a terminal, each having a binding group containing a benzene ring having at least a pair of adjacent hydroxyl groups; and (B) a functional second side chain.

Since the nano-coating material of the present invention has, in a polymer main chain, (A) a first side chain or a terminal, which has a binding group containing a benzene ring having at least a pair of adjacent hydroxyl groups, the binding group of the first side chain, which is capable of coordinate bonding to a metal atom, is strongly bonded to the metal surface, and therefore, the nano-coating material has excellent adhesiveness to a metal or an alloy.

In a case in which the (B) functional second side chain, which is branched from the polymer main chain, is hydrophobic (in the following description, may be described as "hydrophobic second side chain"), the nano-coating material can be utilized as a nano-coating material having excellent antirust properties.

That is, in regard to the development of conventional antirust coating materials, since the main purpose lies in enhancing adhesiveness or in producing a smooth oxide film on the metal surface, in the development of a new antirust coating material, combining the antirust coating material with a hydrophobic material, which is considered to decrease adhesiveness, could not be considered. However, the inventors of the present invention speculated that when the configuration of the antirust coating material is functionally separated, and the antirust coating material is constructed from a polymer that has a binding group having a function of enhancing adhesiveness to the surface of a substrate of a metal or an alloy, which requires rust proofing, and has a hydrophobic group capable of interrupting the approach and contact of reactive substances such as oxygen molecules, water molecules, or halide ions to the substrate surface, adhesiveness could be increased, and the antirust effect could be increased even if the film thickness is thin.

Based on such speculation, the inventors of the present invention conducted a thorough investigation. During the course of this investigation, the present inventors came across a report that Mefps5, which is blue mussel's adhesive protein, strongly adheres to various substrates including metal Au (Non-Patent Literature 2). During an investigation of this report, the present inventors paid attention to the fact that Mefps5 has dopamine. The present inventors synthesized poly(dopamine methacrylamide-co-alkyl methacrylate) and a dopamethacrylamide-styrene copolymer, by combining a binding group having a skeleton of dopamine and a hydrophobic group. Thus, the inventors found that when an antirust nano-coating film containing these polymers as nano-coating materials is formed on the surface of a Mg alloy substrate, the antirust nano-coating film can be easily applied on the Mg alloy substrate and can be strongly adhered thereto, and even if the film thickness is thin, the approach and contact of corrosive reactive substances to the substrate surface can be interrupted, so that a noticeable antirust effect can be obtained. The present inventors conducted a further investigation based on these findings, and thereby completed a new nano-coating material.

(Nano-Coating Material)

In regard to the nano-coating material of the present invention, an embodiment in which the functional second side chain is hydrophobic will be explained.

The nano-coating material of this embodiment is adhered to the surface of a substrate formed from a metal or an alloy, as a nano-coating film having a nano-sized film thickness, and can prevent the approach of water molecules to the substrate surface.

The nano-coating material of this embodiment has, in a polymer main chain, (A) a first side chain or a terminal, which has a binding group containing a benzene ring having at least a pair of adjacent hydroxyl groups; and (B) a hydrophobic second side chain.

Here, the "benzene ring having at least a pair of adjacent hydroxyl groups" means a benzene ring having two or more hydroxyl groups, in which at least any two of these hydroxyl groups are adjacent to each other.

Furthermore, the "binding group" means an organic constituent group that is bonded to the surface of a substrate formed from a metal or an alloy and enables binding and adhesion of a coating material. Furthermore, the term "nano" according to the present invention means a scale of 1 (micrometer) or less, that is, 1000 nm or less.

The polymer main chain in the nano-coating material of the present invention may be any of various polymer chains as long as the purpose and effects of the present invention can be realized thereby, and the realization is not inhibited. For example, the polymer main chain may be composed of carbon (C)-carbon (C) chain-like bonds, and in regard to the carbon (C)-carbon (C) chain-like bond, the bond may be interrupted by a heteroatom, for example, an oxygen atom or a nitrogen atom, or may be interrupted by a carbon (C) ring or a heterocyclic ring. A more preferred example thereof is a carbon (C)-carbon (C) chain-like bond. Furthermore, in regard to the binding group of the (A) first side chain, various binding groups such as described above may be used as long as the binding groups have a benzene ring having at least a pair of adjacent hydroxyl groups. Here, the benzene ring may be a monocyclic ring, or may be a member constituting a polycyclic ring or a heterocyclic ring. Furthermore, the bond between the first side chain having a benzene ring and the polymer main chain may also be in various forms, such as a bond interrupted by a carbon (C) chain, a heteroatom or the like.

The (B) hydrophobic second side chain may also be in various forms. It is desirable that the second side chain constitutes a hydrophobic organic group.

Embodiments will be explained below; however, first, the following formula (2) is a chemical formula representing an example of the nano-coating material according to an embodiment of the present invention. As shown in formula (2), the nano-coating material according to an embodiment of the present invention has a polymer main chain part P, a first side chain $R_1$ having a binding group, and a hydrophobic second side chain $R_2$.

[Chemical Formula 2]

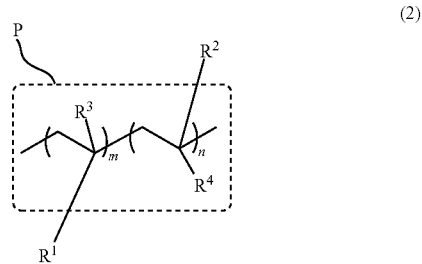

(2)

The polymer main chain part P may be a polymer chain composed of single bonds of carbon (C), that is, a polymer main chain having an alkyl chain. When an alkyl chain is used, the nano-coating material can be dispersed in an organic solvent uniformly with high dispersibility, and a smooth film that has no defects even if the film thickness is thin can be formed easily by a wet coating method such as a spin coating method. For example, a suitable example of the polymer main chain part P may be an alkyl chain formed from a copolymer of acrylamide and an acrylate. Each of symbols $R_3$ and $R_4$ in the polymer main chain part P represents a hydrogen atom or an organic group. The organic group may be of various kinds as long as the purpose and effects of the present invention are not impaired. For example, $R_3$ and $R_4$ each represent a hydroxyl group, or a linear or branched alkyl group having from 1 to 12 carbon (C) atoms, and they may be identical to or different from each other. Examples thereof include a methyl group and an ethyl group.

The ratio m:n between the main chain portion having the first side chain $R_1$ and the main chain portion having the second side chain $R_2$ is preferably adjusted to from 1:6 to 1:100. Thereby, polymerization can be achieved with high yield. Furthermore, a reliable antirust coating effect may be obtained.

The following formula (3) is a chemical formula representing a preferred example of the side chain $R_1$.

[Chemical Formula 3]

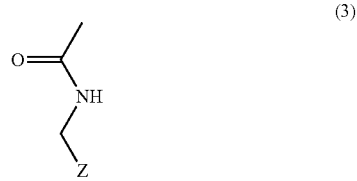

(3)

The side chain $R_1$ shown in formula (3) has a binding group Z.

The binding group Z is an organic group capable of coordinate bonding to a metal atom at the surface of a substrate formed from a metal or an alloy. The binding group Z has a benzene ring having at least one pair of adjacent hydroxyl groups. For example, the binding group Z is a catechol group represented by the following formula (4).

[Chemical Formula 4]

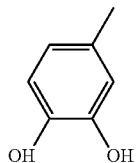

(4)

For example, when the binding group includes such a chemical structure having a benzene ring having at least one pair of adjacent hydroxyl groups, the oxygen of the adjacent hydroxyl groups are coordinate bonded (chelate bonded) to the metal atoms that constitute the metal substrate, and thereby the coating film can be strongly adhered to the surface of the metal substrate.

Of course, the binding group Z may be configured such that the benzene ring has three or more hydroxyl groups. When this configuration is adopted, the number of coordinate bonds formed with metal atoms per functional group increases, and the adhesive power can be enhanced.

FIGS. 1(a) to 1(f) are outline explanatory diagrams for the chemical structure of the nano-coating material according to an embodiment of the present invention. In FIG. 1(a), the binding group Z is shown in the balloon, and it is shown that a catechol group is used as an example of Z. FIG. 1(b) to FIG. 1(f) illustrate examples of the chemical structure concerning the disposition of the binding group Z in the nano-coating material. FIG. 1(b) illustrates a material in which this binding group Z is linked to a terminal side of a linear polymer main chain part P; FIG. 1(c) illustrates a material in which this binding group Z is linked to both terminal sides of a linear polymer main chain part P; FIG. 1(d) illustrates a material in which binding group Z is linked to a short first side chain of a linear polymer main chain part P; FIG. 1(e) illustrates a material in which the binding group Z is linked to both terminal sides and a long first side chain of a linear polymer main chain part P; and FIG. 1(f) illustrates a material in which this binding group Z is linked to the terminal sides of a cross-shaped polymer main chain part P. When the parts P are mutually entangled, film stability is increased.

Furthermore, the nano-coating material may also be configured such that the first side chain $R_1$ has plural binding groups Z. Thereby, the number of adhesive moieties in one side chain can be increased, and the adhesive power can be enhanced.

The second side chain $R_2$ is hydrophobic. When the nano-coating material is configured to include a hydrophobic second side chain $R_2$, a metal surface can be covered with a polymer film having the second side chain $R_2$. Thus, for example, water molecules can be prevented from approaching the surface of a metal substrate, and metal atoms reacting with water molecules and forming rust can be suppressed.

The following formula (5) shows an example of the second side chain $R_2$, which has a hydrophobic group $R_5$.

[Chemical Formula 5]

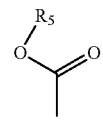

(5)

A suitable example of the hydrophobic group $R_5$ of formula (5) may be an alkyl group having a number of carbon atoms (C) of from 1 to 20. In a case in which the number of carbon atoms (C) is set to 0, that is, in a case in which the functional group $R_5$ is not provided, even if a coating film is formed, a waterproofing effect may not be obtained, and rust is formed. Furthermore, when the number of carbon atoms is set to more than 16, the alkyl chain becomes too long, and it becomes difficult to achieve solubilization in an organic solvent, which is needed for film production.

Specific examples of the hydrophobic group $R_5$ include a methyl group, an ethyl group, a n-propyl group, an isopropyl group, a n-butyl group, a sec-butyl group, an isobutyl group, a tert-butyl group, a pentyl group, a n-hexyl group, a n-heptyl group, a n-octyl group, a n-nonyl group, a n-decyl group, a n-undecyl group, and a n-dodecyl group.

Furthermore, formula (6) shows another example of the second side chain $R_2$, and is formed from a hydrophobic functional group.

[Chemical Formula 6]

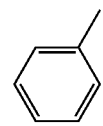

(6)

In formula (6), the second side chain $R_2$ is a phenyl group, which is a hydrophobic functional group. The benzene of the phenyl group may be replaced with a benzene having a further substituent. For example, methylbenzene or anisole (methoxybenzene) may also be used.

Furthermore, not only a benzene ring, but also a functional group having a polycyclic aromatic hydrocarbon (PAH) such as perylene or pyrene may be used, and particularly, a functional group having an acene-based polycyclic aromatic hydrocarbon such as naphthalene, anthracene or pentacene may also be used.

As such, the nano-coating material of this embodiment is formed from a compound which has, in a polymer main chain, (A) a first side chain or a terminal, each having a binding group containing a benzene ring having at least one pair of adjacent hydroxyl groups, and (B) a hydrophobic second side chain. For example, a preferred example of a compound having excellent adhesiveness to a substrate is the following compound.

[Chemical Formula 7]

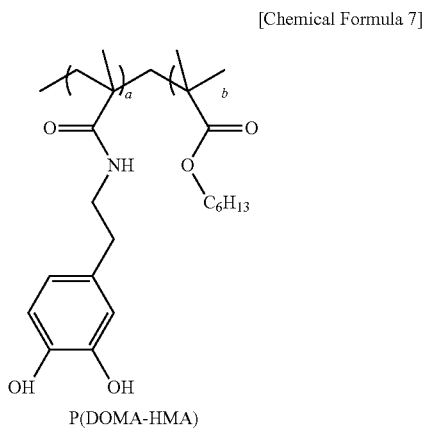

P(DOMA-HMA)

Since P(DOMA-HMA) has a catechol group in a first side chain, the binding group capable of coordinate bonding to a metal atom can strongly adhere the coating film to the metal surface. Furthermore, since P(DOMA-HMA) has a hydrophobic second side chain, and the hydrophobic group can prevent the approach of water molecules to the surface of a substrate formed from a metal or an alloy, the material can be utilized as a nano-coating material having antirust properties.

Since the nano-coating material of the present invention can have, for example, an ionic group that assists ion transportation, an ethylene glycol group or the like freely introduced thereinto, the nano-coating material can be applied to various applications. Furthermore, the nano-coating material of the present invention can be imparted with solubility that is necessary according to various applications by, for example, controlling the counter part of the catechol group.

(Method for Producing a Nano-Coating Material)

Next, an embodiment of the method for producing a nano-coating material of the present invention will be explained.

The method for producing a nano-coating material of the present invention includes a step for polymerizing a first monomer having a binding group containing a benzene ring having at least one pair of adjacent hydroxyl groups, and a second monomer having a hydrophobic functional group.

(Monomer-Dispersed Solution Production Step S1)

In this step, the first monomer and the second monomer are dispersed in an organic solvent, and thereby a monomer-dispersed solution is produced.

Here, in the first monomer, for example, suitably, a first side chain $R_1$ having a binding group and an organic group $R_3$ are bonded to a C=C carbon double bond at one terminal side of this C=C carbon double bond.

In the second monomer, a hydrophobic second side chain $R_2$ and an organic group $R_4$ are bonded to a C=C carbon double bond at one terminal side of this C=C carbon double bond.

Examples of the first monomer in this case include dopamine methacrylamide (N-(3,4-d ihydroxyphenethyl) methacrylamide).

Dopamine methacrylamide (N-(3,4-dihydroxyphenethyl) methacrylamide) has a C=C carbon double bond, and a methyl group and a side chain containing dopamine on one terminal side of this C=C carbon double bond. Dopamine has a binding group having a benzene ring having at least one pair of hydroxyl substituents.

Instead of a methyl group of the methacrylamide, a hydroxyl group or a linear or branched alkyl group having a number of carbon atoms (C) of from 1 to 12 may also be used.

Examples of the second monomer include methyl methacrylate and styrene.

Methyl methacrylate has a C=C carbon double bond, and on one terminal side of this C=C carbon double bond, a methyl group and a hydrophobic side chain formed from a methyl-ester group.

Styrene has a C=C carbon double bond, and on one terminal side of this C=C carbon double bond, a methyl group and a hydrophobic side chain formed from a phenyl group.

In these examples, the hydrophobic second side chain $R_2$ is a methyl-ester group or a phenyl group. Instead of the methyl group of the methyl-ester group, a hydroxyl group or a linear or branched alkyl group having a number of carbon atoms (C) of from 1 to 12 may also be used. By having such a hydrophobic second side chain $R_2$, efficient water repelling can be achieved.

(Monomer Polymerization Step S2)

In this step, the monomers in the monomer-dispersed solution are polymerized.

The following chemical reaction scheme (7) shows an example of the polymerization reaction.

[Chemical Formula 8]

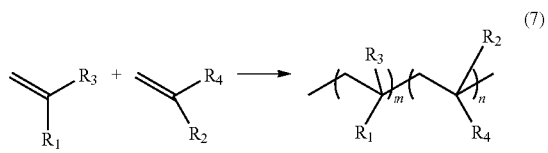

(7)

The polymerization reaction described above is carried out by, for example, a heated reaction using AIBN (2,2'-azobisisobutyronitrile) as a polymerization initiator. Thereby, polymerization can be carried out efficiently.

For example, a heated polymerization reaction can be carried out using methacrylamide as a first raw material monomer and using a methacrylate as a second raw material monomer. In this case, the polymerization reaction can be completed by using DMF as a solvent, using 1 to 2 mol % of AIBN as a polymerization initiator, and heating the system for 30 to 50 hours at 70° C. to 80° C.

In chemical reaction scheme (8), an example of the polymerization reaction in the case of using methacrylamide and a methacrylate is presented.

[Chemical Formula 9]

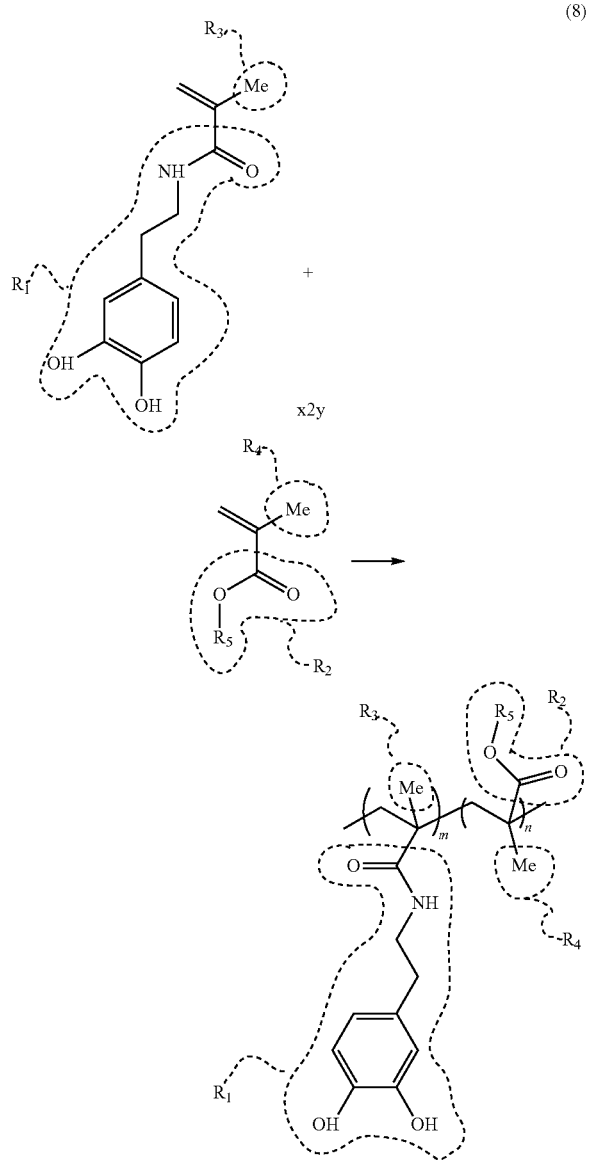

(8)

Instead of a heated polymerization reaction, or in combination with this, a photopolymerization reaction may also be carried out using a photopolymerization initiator.

(Nano-Coating Film)

Figure 2:
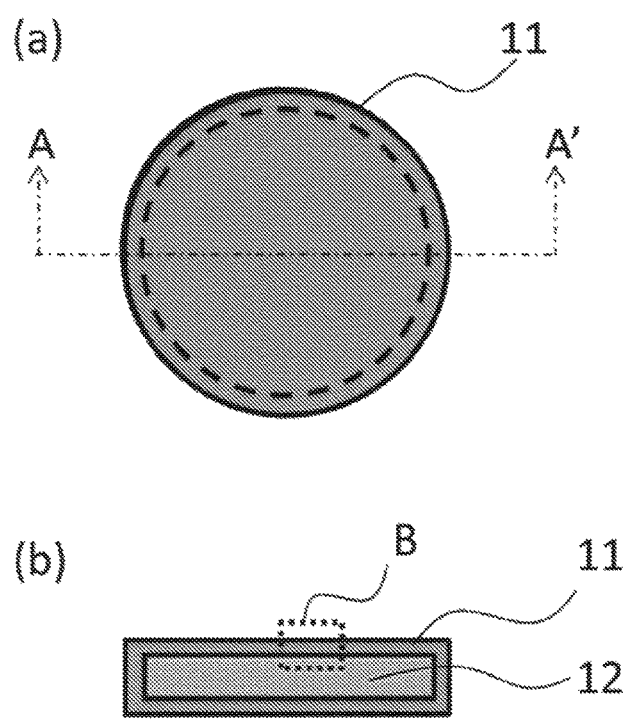
FIGS. 2(a) and 2(b) show diagrams illustrating an example of forming an antirust nano-coating film according to an embodiment of the present invention on a metal/alloy substrate, the diagrams including (a) a plan view diagram, and (b) a cross-sectional view diagram of (a) cut at the line A-A'.

Next, an embodiment of the functional material of the present invention will be explained. FIG. 2 shows (a) a plan view diagram illustrating an embodiment of the functional material of the present invention, and (b) a cross-sectional view diagram of (a) cut at the line A-A'.

Regarding the substrate 12 formed from a metal or an alloy, a disc-shaped substrate 12 is used in this example. A nano-coating film 11 is formed so as to cover the entire surface of the substrate 12 at a uniform film thickness.

The nano-coating film 11 is formed using the nano-coating material of the present invention. The film thickness of the nano-coating film 11 is preferably adjusted to from 100 nm to 1 μm. If the film thickness is 100 nm or less, the approach of water molecules to the surface of the substrate 12 cannot be sufficiently prevented, and it is difficult to obtain a sufficient antirust effect. On the contrary, if the film thickness is more than 1 μm, despite that the antirust effect does not change much, the burden of the material cost increases.

Meanwhile, the nano-coating film 11 is preferably a film in which pores having a pore size of 50 nm or more do not exist. Thereby, the approach of water molecules to the surface of a substrate formed from a metal or an alloy can be prevented, and an antirust effect can be increased.

(Principle of Adhesion of Nano-Coating Film)

Figure 3:
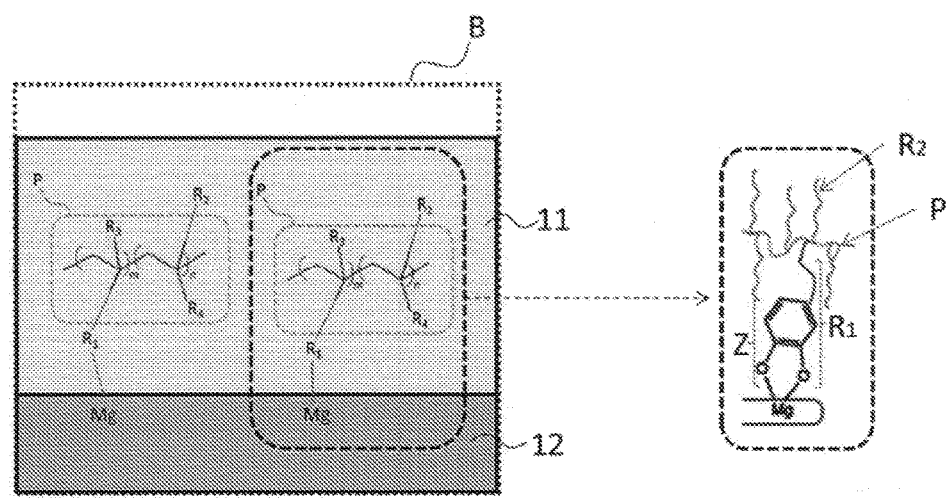
FIG. 3 is a magnified outline diagram illustrating the state of molecular bonding of part B in FIG. 2(b), the diagram illustrating an example of the principle of adhesion of an antirust nano-coating film in a case in which the nano-coating materials represented by chemical formulae (2) and (4) are used for an antirust nano-coating film 11, and metal Mg or a Mg alloy is used as a metal/metal alloy substrate 12.

FIG. 3 is a magnified outline diagram of part B of FIG. 2(b), and is a diagram illustrating an example of the principle of adhesion of a nano-coating film in a case in which the nano-coating material represented by formulae (2) and (4) described above is used as the nano-coating film 11, and metal Mg or a Mg alloy is used as the metal/metal alloy substrate 12.

As illustrated in FIG. 3, the nano-coating film 11 strongly adheres to the metal/metal alloy substrate 12 with the first side chain $R_1$. Specifically, the nano-coating film 11 strongly adheres to the substrate 12 by means of the binding group Z of the first side chain $R_1$. In a case in which the binding group Z is a catechol group, adjacent hydroxyl groups of the catechol group, that is, the two adjacent hydroxyl groups bonded to a benzene ring, strongly adhere to the Mg metal atoms of the metal/metal alloy substrate 12 by coordinate bonding.

Furthermore, the benzene rings of the catechol groups undergo π-stacking and stabilize the film, and thus a strong film is formed.

On the other hand, the nano-coating film 11 prevents contact between the surface of the metal/metal alloy substrate 12 and water molecules and the like, as the hydrophobic second side chain $R_2$ suppresses penetration of water molecules and the like from the outside, and thereby prevents the generation of rust at the surface of the metal/metal alloy substrate 12.

Figure 4:
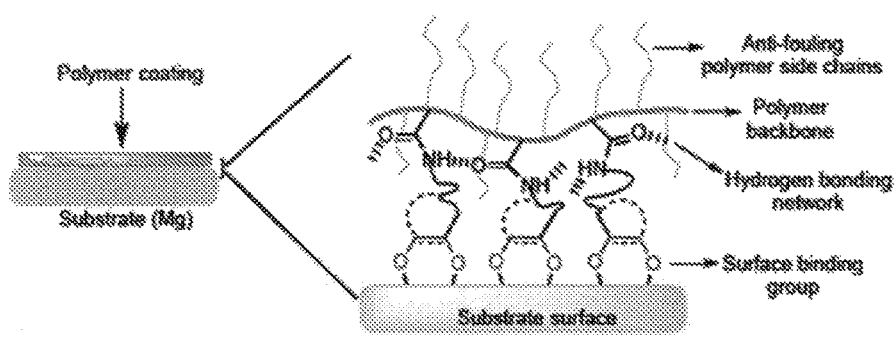
FIG. 4 is an outline diagram illustrating an example of the principle of adhesion of an antirust nano-coating film (polymer coating) in a case in which a metal/metal alloy substrate (metal Mg or a Mg alloy) is used.

FIG. 4 is also a diagram illustrating an example of the principle of adhesion of the nano-coating film (polymer coating) in the case of using a metal/metal alloy substrate (metal Mg or a Mg alloy).

Plural side chains from a polymer backbone, which is the polymer main chain, are bound, and in some of the side chains (first side chains), an oxygen atom adjacent to the benzene ring functions as binding group (surface binding group) and is coordinate bonded to the metal surface, thereby adhering the film to the metal.

Furthermore, the oxygen atom of an amide bond that links this binding group to the main chain, forms a hydrogen bond network with the hydrogen atoms of other amide bonds, and thus a stable film is formed.

Furthermore, another side chain (second side chain) bound to the polymer main chain is hydrophobic, and functions as an antirust polymer side chain (anti-corrosion polymer side-chain).

(Method for Producing Functional Material)

Next, an embodiment of the method for producing a functional material of the present invention will be explained.

The method for producing a functional material of the present invention has nano-coating material dispersion liquid production step F1 and film-forming step F2.

(Nano-Coating Material Dispersion Liquid Production Step F1)

In this step, a nano-coating material is dispersed in an organic solvent, and a nano-coating material dispersion liquid is produced. In this dispersion liquid, various additives may be added as necessary. Examples of these additives include a viscosity adjusting agent, a photodegradation inhibitor, an antioxidant, and a colorant, and the additives can be selected by considering the use environment, application, purpose, and the like of the antirust nano-coating film.

It is preferable that after the nano-coating material is added to an organic solvent, the mixture is uniformly dispersed by stirring thoroughly.

Examples of the organic solvent include DMF and DMSO.

(Film-forming step F2)

In this step, the nano-coating material dispersion liquid is applied on a substrate surface by, for example, a wet coating method, and then dried, and thereby a nano-coating film is formed. The nano-coating film can be formed as a smooth film.

Examples of the wet coating method include a spin coating method, a dipping method, and a casting method. Drying may be carried out by natural drying of leaving the film to stand at room temperature, but may also be carried out by drying by heaving in an oven.

For example, in the functional material produced as such, since the nano-coating material has excellent adhesiveness to a metal or an alloy and can have an ionic group that assists ion transportation, an ethylene glycol group or the like freely introduced thereinto, the functional material can be applied to various applications. Therefore, the functional material can be imparted with not only antirust properties but also with various functions according to applications.

Thus, in regard to the nano-coating material of the present invention, an embodiment in which the functional second side chain is hydrophobic has been explained; however, an embodiment in which the functional second side chain is hydrophilic (in the following description, may be described as "hydrophilic second side chain") is also included in the nano-coating material of the present invention. In the following, an embodiment in which the second side chain is hydrophilic will be explained; however, parts of the explanation for the matters that are common in the embodiment in which the second side chain is hydrophobic will not be repeated.

That is, a nano-coating material according to another embodiment has, in a polymer main chain, (A) a first side chain or a terminal, which has a binding group containing a benzene ring having at least one pair of adjacent hydroxyl groups; and (B) a hydrophilic second side chain.

Examples of the hydrophilic group of the second side chain include ethylene glycol, an alkylamine, and an alkylammonium.

This embodiment also has, in a polymer main chain, (A) a first side chain or a terminal, which has a binding group containing a benzene ring having at least one pair of adjacent hydroxyl groups, and since the binding group that is capable of coordinate bonding to a metal atom is strongly bonded to a metal surface, the nano-coating material has excellent adhesiveness to a metal or an alloy.

On the other hand, since the nano-coating material has a hydrophilic second side chain, for example, utilization thereof in a binder for a lithium ion battery electrode or the like is expected.

As such, in a case in which the nano-coating material is a compound which has, in a polymer main chain, (A) a first side chain or a terminal, each having a binding group containing a benzene ring having at least one pair of adjacent hydroxyl groups, and (B) a hydrophilic second side chain, for example, the following compounds may be listed as preferred examples of a material having excellent adhesiveness to substrates.

[Chemical Formula 10]

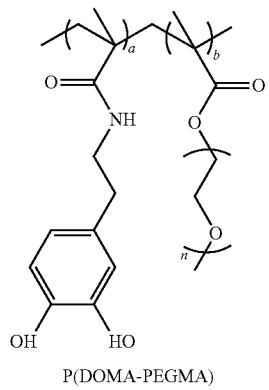

P(DOMA-PEGMA)

[Chemical Formula 11]

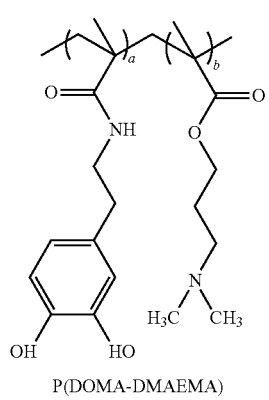

P(DOMA-DMAEMA)

P(DOMA-DMAEMA) is cationic, whereas P(DOMA-PEGMA) is neutral. These nano-coating materials can be utilized as materials for a coating agent for preventing lithium ions from forming needles. For example, since P(DOMA-DMAEMA) does not dissolve in ethylene carbonate, this substance can be utilized as a binder for a lithium ion battery electrode, or the like. Also for P(DOMA-PEGMA), utilization thereof as, for example, a binder for a lithium ion battery electrode is expected.

Furthermore, the method for producing a nano-coating material of this embodiment may include a step for polymerizing a first monomer having a binding group containing a benzene ring having at least one pair of adjacent hydroxyl groups, with a second monomer having a hydrophilic functional group.

Examples of the second monomer having a hydrophilic functional group include ethylene glycol, an alkylamine, and an alkylammonium.

According to the present invention as described above, the following remarkable effects are realized.

Since the nano-coating material is configured to include a polymer main chain part P; a first side chain $R_1$ having a binding group Z formed from a benzene ring having at least a pair of adjacent hydroxyl groups; and a functional second side chain $R_2$, the nano-coating material can be dispersed in an organic solvent and applied easily, uniformly and smoothly by a wet coating method, and the binding group Z of the first side chain $R_1$ that is capable of coordinate bonding to a metal atom can strongly adhere the coating film to the metal surface. Furthermore, in a case in which the second side chain $R_2$ is hydrophobic, since the hydrophobic second side chain $R_2$ can prevent the approach of water molecules and the like to the surface of a substrate formed from a metal or an alloy, a nano-coating material which is capable of forming a coating film that has a high antirust effect even if the film thickness is thin, can be provided.

Also, since the nano-coating material of the present invention has a configuration in which the polymer main chain part P is a polymer chain composed of single bonds of carbon atoms (C), the nano-coating material can be dispersed in an organic solvent and applied easily, uniformly and smoothly by a wet coating method, and a nano-coating material which is capable of forming a nano-coating film having a high antirust effect can be provided.

Since the nano-coating material of the present invention has a configuration in which the polymer main chain part P is composed of a copolymer of acrylamide and an acrylate, the nano-coating material can be dispersed in an organic solvent and applied easily, uniformly and smoothly by a wet coating method, and thus, a nano-coating material which is capable of forming a nano-coating film that exhibits excellent adhesiveness to a metal or an alloy even if the film thickness is thin, can be provided.

The nano-coating material of the present invention is configured such that the binding group Z is a catechol group, the binding group of the first side chain $R_1$ that is capable of coordinate bonding to a metal atom can strongly adhere the coating film to the metal surface, and a nano-coating material which is capable of forming a coating film that exhibits excellent adhesiveness to a metal or an alloy even if the film thickness is thin, can be provided.

Since the nano-coating material of the present invention is configured such that the functional (hydrophobic) second side chain $R_2$ has an alkyl group having a number of carbon atoms (C) of from 1 to 12, the hydrophobic second side chain $R_2$ can prevent the approach of water molecules and the like to the surface of a substrate formed from a metal or an alloy, and therefore, a nano-coating material which is capable of forming a coating film that exhibits excellent adhesiveness to a metal or an alloy even if the film thickness is thin, can be provided.

Since the nano-coating material of the present invention is configured such that the functional (hydrophobic) second side chain $R_2$ is a functional group containing a benzene ring, the approach of water molecules and the like to the surface of a substrate formed from a metal or an alloy can be prevented, and therefore, an antirust coating material which is capable of forming a coating film that has a high antirust effect even if the film thickness is thin can be provided.

The method for producing a nano-coating material of the present invention is configured to include a step for dispersing a first monomer having a binding group that has a benzene ring having at least one pair of adjacent hydroxyl substituents, and a second monomer having a hydrophobic group or a hydrophilic group in an organic solvent, and thereby producing a monomer-dispersed solution; and a step for polymerizing the monomers in the monomer-dispersed solution. Therefore, a nano-coating material having a polymer main chain, a first side chain having a binding group that has a benzene ring having at least one pair of adjacent hydroxyl groups, and a hydrophobic second side chain can be produced easily with high yield.

Since the method for producing a nano-coating material of the present invention is configured such that the first monomer has an acrylamide group, and the acrylamide group has a hydroxyl group or an alkyl group having a number of carbon atoms (C) of from 1 to 12, a nano-coating material having a polymer main chain can be produced easily with high yield.

Since the method for producing a nano-coating material according to an embodiment of the present invention is configured such that the second monomer has a methacrylate group, and the methacrylate group has a hydroxyl group or an alkyl group having a number of carbon atoms (C) of from 1 to 12, a nano-coating material having a polymer main chain can be produced easily with high yield.

Since the method for producing a nano-coating material according to an embodiment of the present invention is configured such that the functional group of the functional (hydrophobic) second side chain is an alkyl group having a number of carbon atoms (C) of from 1 to 12, or a functional group containing a benzene ring, a nano-coating material having a polymer main chain and a hydrophobic side chain can be produced easily with high yield.

Since the method for producing a nano-coating material of the present invention is configured such that polymerization is carried out by a heated reaction using AIBN as a polymerization initiator, a coating material having a polymer main chain can be produced easily with high yield.

In the functional material of the present invention, a nano-coating film based on a nano-coating material is formed on the surface of a substrate formed from a metal or an alloy, and the binding group of the first side chain or a terminal of the nano-coating material can strongly adhere to a metal atom at the metal surface through coordinate bonding. Furthermore, in a case in which the functional second side chain is hydrophobic, the hydrophobic group can prevent the approach of water molecules to the surface of a substrate formed from a metal or an alloy, and can thereby protect the metal surface with a high antirust effect. Furthermore, since the nano-coating material of the present invention has excellent adhesiveness to a metal or an alloy, for example, the functional material of the present invention also includes a form in which the nano-coating material is bonded as a binder to a lithium battery ion battery electrode as a substrate.

Since the nano-coating film of the functional material of the present invention has a configuration in which the film thickness is 100 nm or more and less than 1 μm, even if the film thickness is thin, excellent adhesiveness to the substrate surface is obtained.

The method for producing a functional material of the present invention is configured to include a step for first dispersing the nano-coating material described above in an organic solvent, and producing a nano-coating material dispersion liquid; and a step for applying the nano-coating material dispersion liquid on the substrate surface by a wet coating method, followed by drying, and thereby forming a nano-coating film. Therefore, the binding group that is capable of coordinate bonding to a metal atom can strongly adhere the coating film to a metal surface.

The present invention is not intended to be limited to the embodiments described above, and can be carried out in various modifications within the scope of the technical idea of the present invention. Specific examples of the present embodiments will be disclosed in the following Examples. Of course, the present invention is not intended to be limited to these Examples.

EXAMPLES

Example 1

(Material Preparation and Evaluation of Characteristics)

As illustrated in the following chemical reaction scheme (9), material (DOMA1) as a first raw material monomer and material (methyl methacrylate) as a second raw material monomer were mixed at a feed ratio (x:y) of (1:2.5), and then, the mixture was dispersed in DMF together with AIBN as a radical initiator to produce a monomer-dispersed solution. Subsequently, while the monomer-dispersed solution was stirred at 75° C. for 40 hours, the monomer-dispersed solution was subjected to a free radical polymerization reaction. The AIBN concentration in DMF was adjusted to 1.5 mol %.

[Chemical Formula 12]

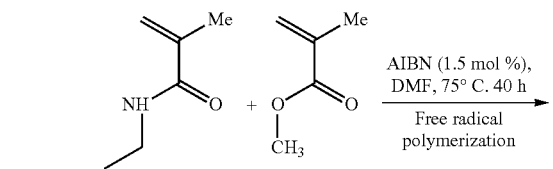
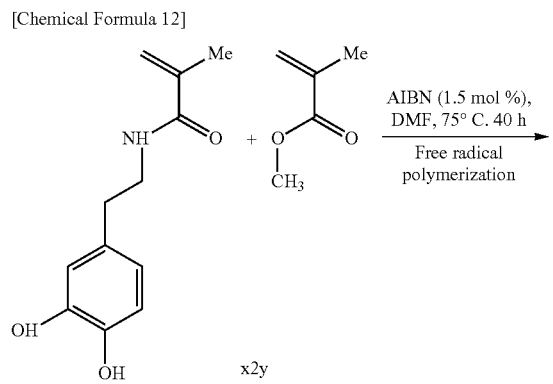
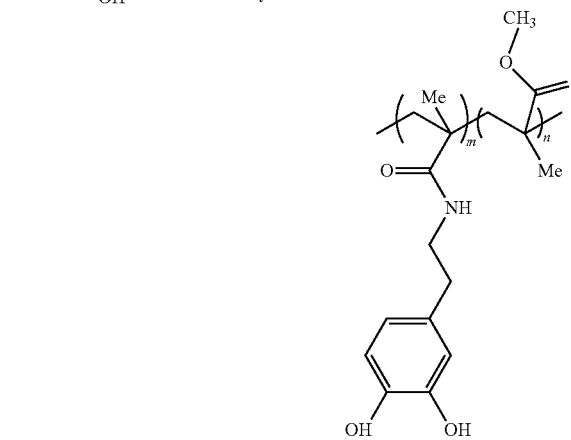

Next, a poor solvent (acetone) was added to the monomer-dispersed solution to cause reprecipitation, and thereby, a product in a white powder form (sample of Example 1) was obtained.

Figure 5:
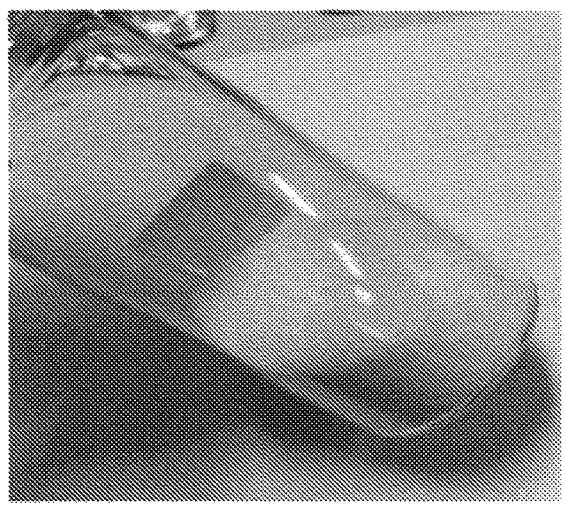
FIG. 5 is an optical photograph of the sample of Example 1.

FIG. 5 is an optical photograph of the sample of Example 1 (indicated as DOMA-$C_1$).

Next, a 1H NMR analysis was conducted. According to a calculation based on the results of the 1H NMR analysis of the sample of Example 1, the ratio m:n was 1:5 in the sample of Example 1 (DOMA-$C_1$).

Example 2

A sample of Example 2 was produced in the same manner as in the case of the sample of Example 1, except that the feed ratio was set to 1:5.

Figure 6:
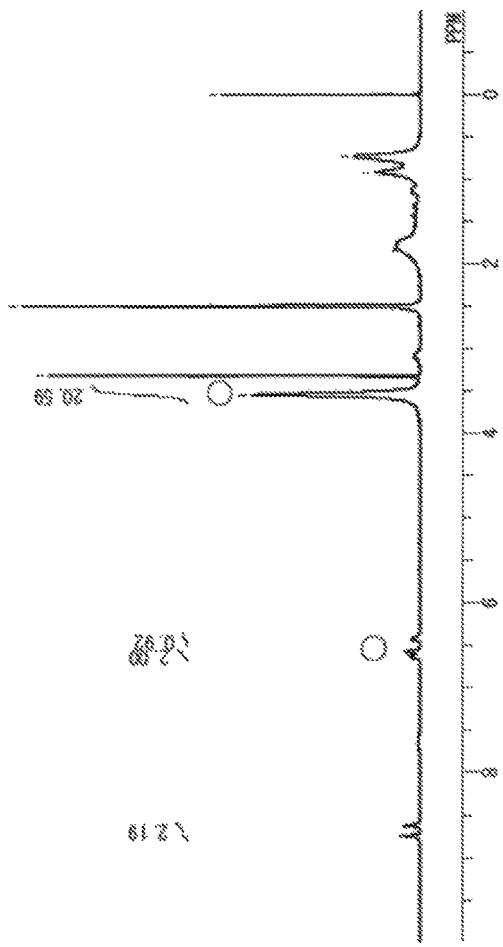
FIG. 6 is a graph illustrating the 1H-NMR analysis results corresponding to the polymer structure of the sample of Example 2.
Figure 6:
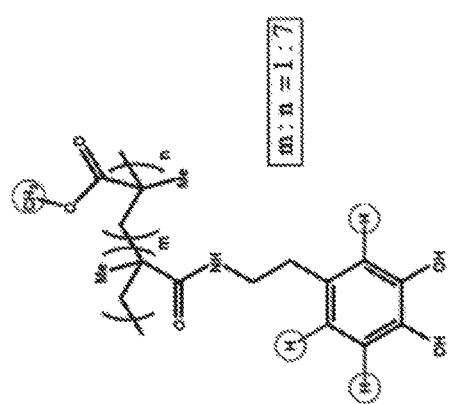

Next, a 1H NMR analysis was conducted. FIG. 6 is a graph illustrating the results of a 1H NMR analysis of the sample of Example 2. For the sample of Example 2, a molecular structure exhibiting the positions of 1H corresponding to the NMR peaks is also disclosed. The ratio m:n for the sample of Example 2, was 1:7.

Example 3

A sample of Example 3 was produced in the same manner as in the case of the sample of Example 1, except that the feed ratio (x:y) was set to 1:10.

Figure 7:
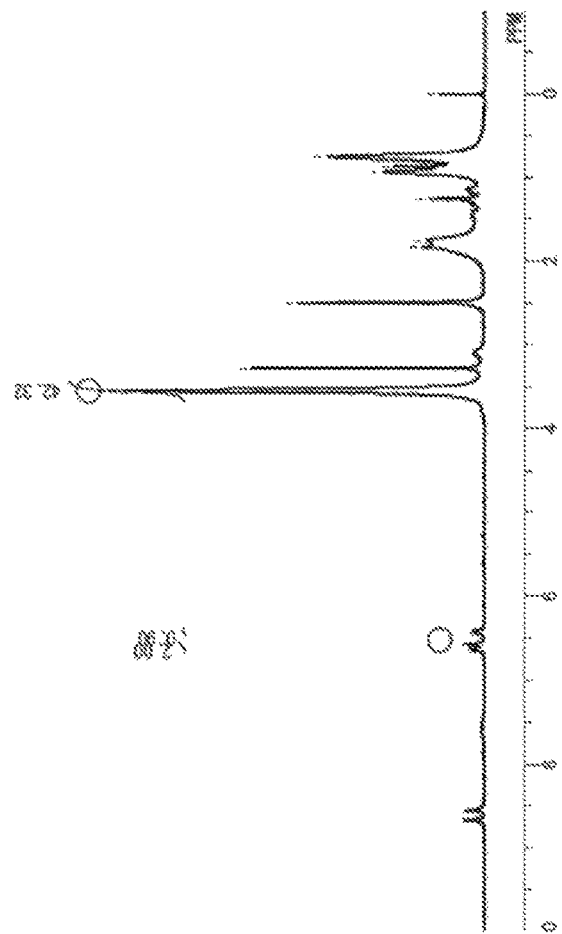
FIG. 7 is a graph illustrating the 1H-NMR analysis results corresponding to the polymer structure of the sample of Example 3.
Figure 7:
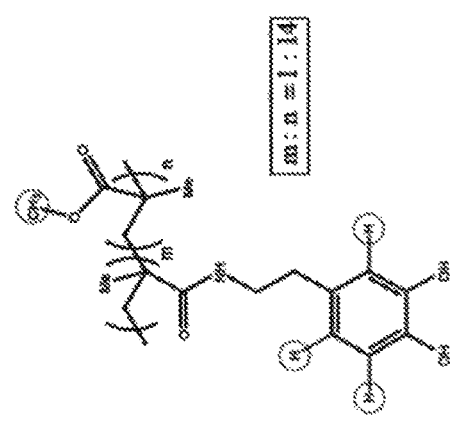

Next, a 1H NMR analysis was conducted. FIG. 7 is a graph illustrating the results of a 1H NMR analysis of the sample of Example 3. For the sample of Example 3, a molecular structure exhibiting the positions of 1H corresponding to the NMR peaks is also disclosed. The ratio m:n for the sample of Example 3 was 1:14.

Example 4

A sample of Example 4 was produced in the same manner as in the case of the sample of Example 1, except that material (hexyl methacrylate) was used as the second raw material monomer as illustrated in the following chemical reaction scheme (10), and the feed ratio (x:y) was set to 1:1.

Figure 8:
FIG. 8 is an optical photograph of the sample of Example 4.

FIG. 8 is an optical photograph of the sample of Example 4 (indicated as DOMA-$C_6$).

The free radical polymerization reaction represented by chemical reaction scheme (10) was carried out.

[Chemical Formula 13]

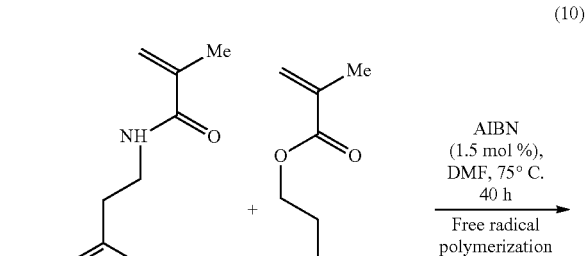
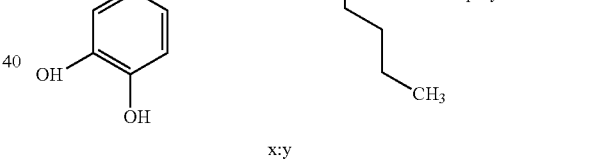
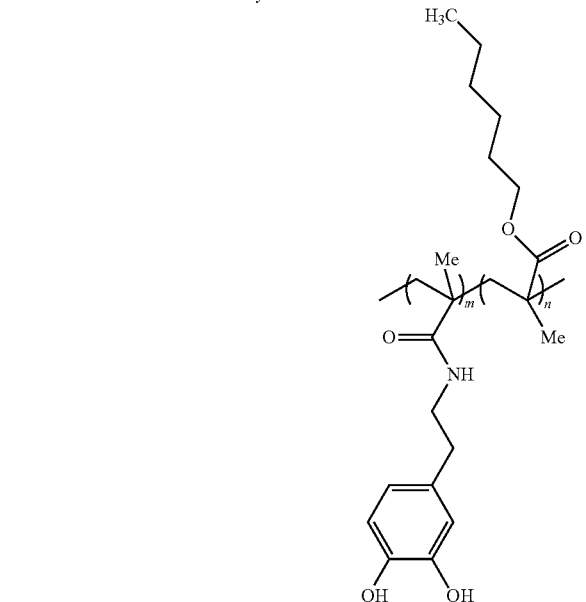

According to a 1H NMR analysis, the ratio m:n for the sample of Example 4 was 1:4.

Example 5

A sample of Example 5 was produced in the same manner as in the case of the sample of Example 1, except that the same material as Example 4 (hexyl methacrylate) was used as the second raw material monomer, and the feed ratio (x:y) was set to 1:2.

According to a 1H NMR analysis, the ratio m:n for the sample of Example 5 was 1:6. Precipitation was carried out using water.

Example 6

A sample of Example 6 was produced in the same manner as in the case of the sample of Example 1, except that the same material as Example 4 (hexyl methacrylate) was used as the second raw material monomer, and the feed ratio (x:y) was set to 1:4.

Figure 9:
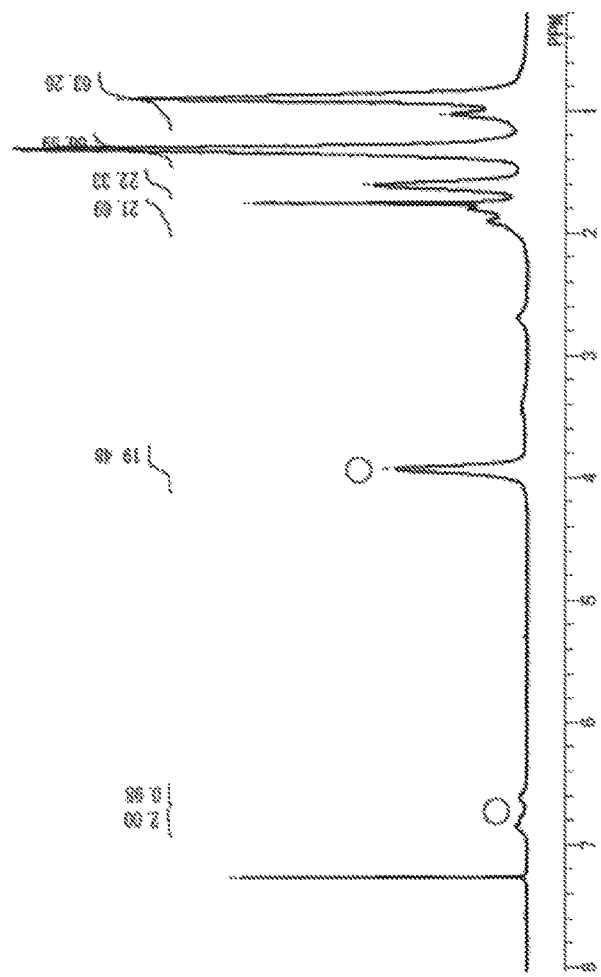
FIG. 9 is a graph illustrating the 1H-NMR analysis results corresponding to the polymer structure of the sample of Example 6.
Figure 9:
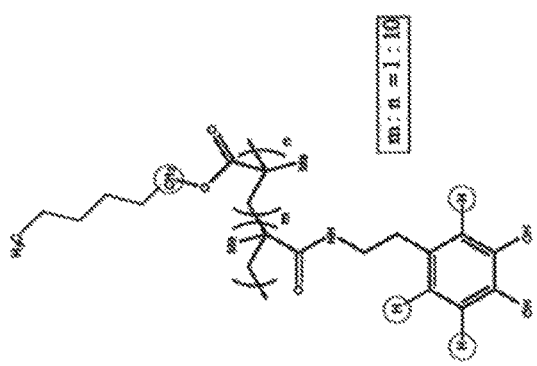

Next, a 1H NMR analysis was conducted. FIG. 9 is a graph showing the 1H NMR analysis results of the sample of Example 6. For the sample of Example 6, a molecular structure exhibiting the positions of 1H corresponding to the NMR peaks is also disclosed. The ratio m:n for the sample of Example 6 was 1:10.

Figure 10:
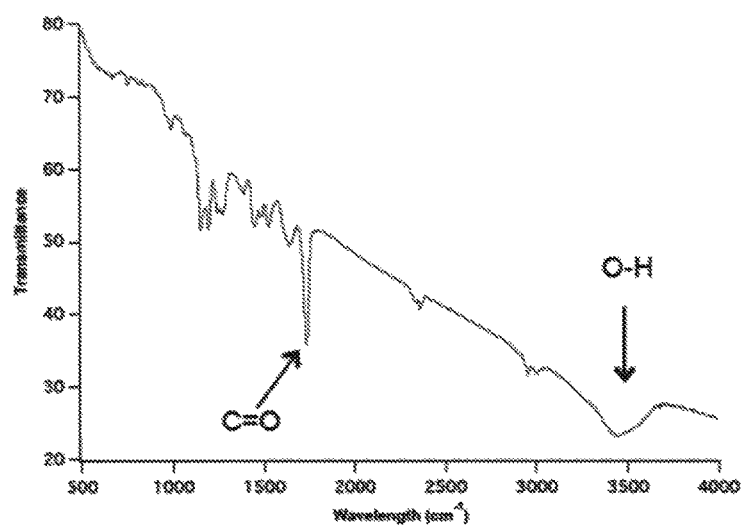
FIG. 10 is a graph illustrating the IR spectral analysis results for the sample of Example 6.

Next, an IR spectral analysis was conducted. FIG. 10 is a graph showing the results of the IR spectral analysis of the sample of Example 6. An O—H absorption peak and a C=O absorption peak were observed.

Example 7

A sample of Example 7 was produced in the same manner as in the case of the sample of Example 2, except that the time for the free radical polymerization reaction illustrated in chemical reaction scheme (9) was set to 24 hours.

According to a 1H NMR analysis, the ratio m:n for the sample of Example 7 was 1:7.

Example 8

A sample of Example 8 was produced in the same manner as in the case of the sample of Example 3, except that the time for the free radical polymerization reaction illustrated in chemical reaction scheme (9) was set to 24 hours.

According to a 1H NMR analysis, the ratio m:n for the sample of Example 8 was 1:14.

Example 9

A sample of Example 9 was produced in the same manner as in the case of the sample of Example 8, except that the feed ratio (x:y) was set to 1:30.

According to a 1H NMR analysis, the ratio m:n for the sample of Example 9 was 1:33.

Example 10

A sample of Example 10 was produced in the same manner as in the case of the sample of Example 8, except that the feed ratio (x:y) was set to 1:90.

According to a 1H NMR analysis, the ratio m:n for the sample of Example 10 was 1:100.

Example 11

A sample of Example 11 was produced in the same manner as in the case of the sample of Example 6, except that the time for the free radical polymerization reaction illustrated in chemical reaction scheme (10) was set to 24 hours.

According to a 1H NMR analysis, the ratio m:n for the sample of Example 11 was 1:10.

Next, a GPC analysis was carried out.

Figure 11:
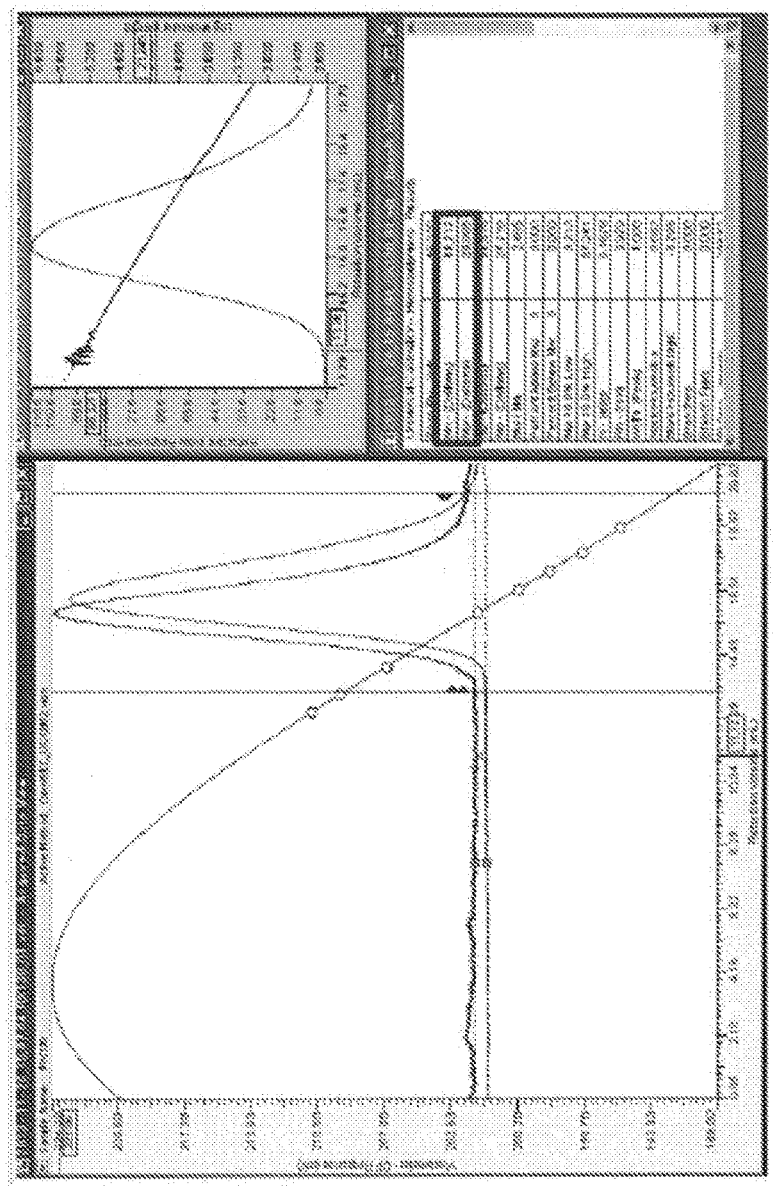
FIG. 11 is a graph illustrating the GPC analysis results for the sample of Example 11.

FIG. 11 is a graph showing the results of a GPC analysis of the sample of Example 11.

Example 12

A sample of Example 12 was produced in the same manner as in the case of the sample of Example 1, except that material (dodecyl methacrylate) was used as the second raw material monomer as illustrated in the following chemical reaction scheme (11), the time for the free radical polymerization reaction was set to 24 hours, and the feed ratio (x:y) was set to 1:3.

Figure 12:
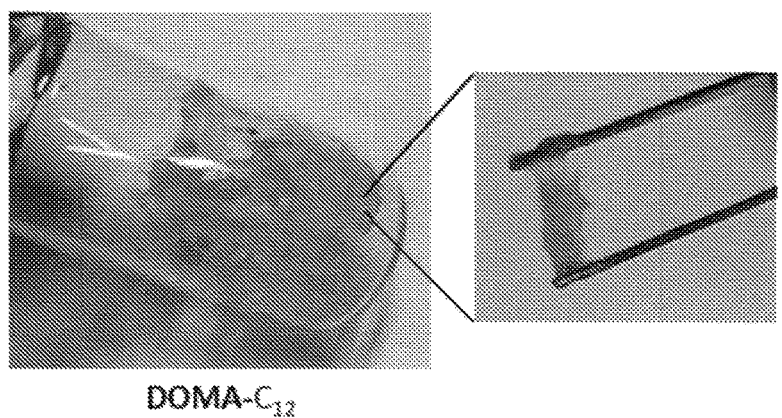
FIG. 12 is an optical photograph of the sample of Example 12.

FIG. 12 is an optical photograph of the sample of Example 12 (indicated as DOMA-$C_{12}$).

A free radical polymerization reaction was carried out.

[Chemical Formula 14]

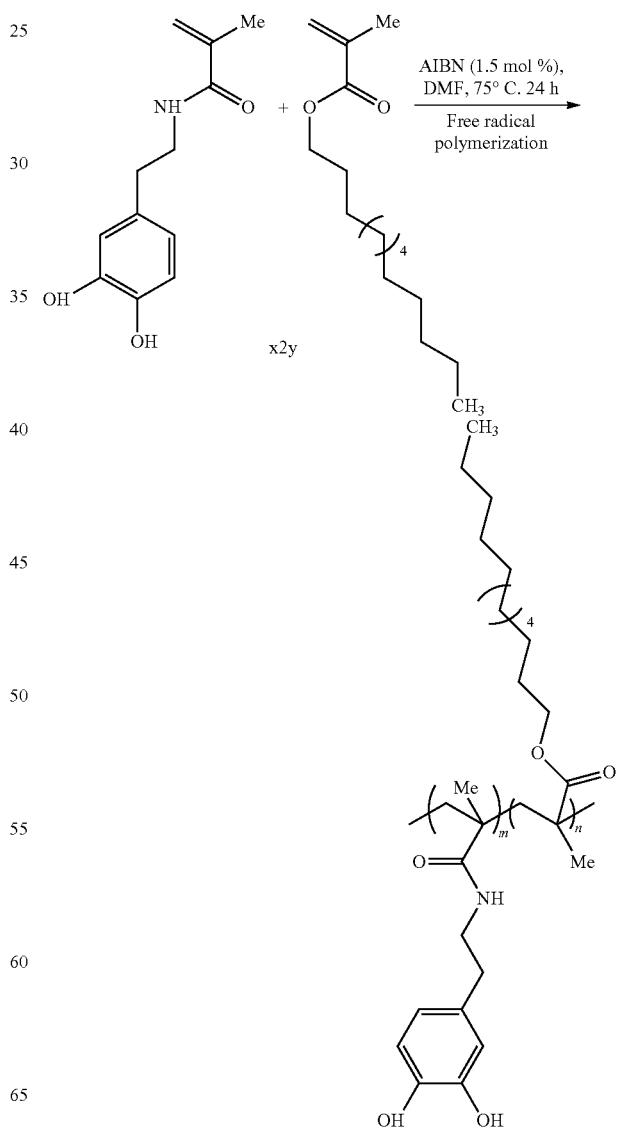

(11)

According to a 1H NMR analysis, the ratio m:n for the sample of Example 12 was 1:6.

Example 13

A sample of Example 13 was produced in the same manner as in the case of the sample of Example 1, except that material (styrene) was used as the second raw material monomer as illustrated in the following chemical reaction scheme (12), the time for the free radical polymerization reaction was set to 24 hours, and the feed ratio (x:y) was set to 1:7.

A free radical polymerization reaction was carried out. Reprecipitation was carried out using water.

[Chemical Formula 15]

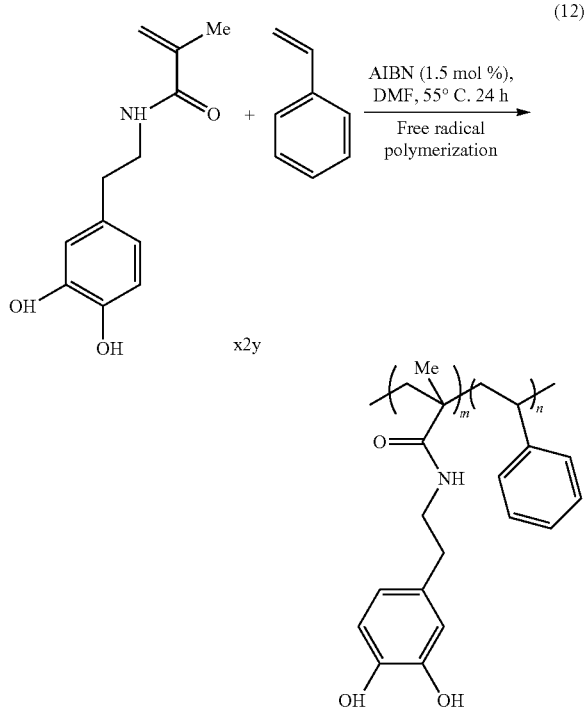

According to a 1H NMR analysis, the ratio m:n for the sample of Example 13 was 1:10.

Table 1 is a table presenting the synthesis conditions and the synthesis results for the samples of Examples, and is a table presenting the abbreviations, raw material names of x and y, feed ratio (raw material composition), analytic ratio (synthesized material composition), polymerization time, mass percent (%) of catechol groups, yield, molecular weight, and PDI.

Results indicating that when the proportion of DOMA increased, the molecular weight decreased, and the yield also decreased, were obtained.

TABLE 1

| Name | x | y | Feed ratio (x:y) (initial ratio) | Analytic ratio (m:n) | Polymerization time (h) | catechol unit (wt %) | Yield (%) | Mw (gmol$^{-1}$) | PDI (Mw/Mn) |
|---|---|---|---|---|---|---|---|---|---|
| Example 1 | Doma-C$_1$(1:5)40 h | Doma | MMA | 1:2.5 | 1:5 | 40 | 31 | 9 | 6700 | 3.01 |
| Example 2 | Doma-C$_1$(1:7)40 h | Doma | MMA | 1:5 | 1:7 | 40 | 24 | 83 | 20300 | 1.97 |
| Example 3 | Doma-C$_1$(1:14)40 h | Doma | MMA | 1:10 | 1:14 | 40 | 14 | 89 | 34100 | 2.23 |
| Example 4 | Doma-C$_6$(1:4)40 h | Doma | HMA | 1:1 | 1:4 | 40 | 25 | 14 | 4700 | 2.11 |
| Example 5 | Doma-C$_5$(1:6)40 h | Doma | HMA | 1:2 | 1:6 | 40 | 18 | 79 | 20200 | 3.01 |
| Example 6 | Doma-C$_6$(1:10)40 h | Doma | HMA | 1:4 | 1:10 | 40 | 12 | 73 | 28800 | 2.46 |
| Example 7 | Doma-C$_1$(1:7)24 h | Doma | MMA | 1:5 | 1:7 | 24 | 25 | 71 | 10,300 | 1.97 |
| Example 8 | Doma-C$_1$(1:14)24 h | Doma | MMA | 1:10 | 1:14 | 24 | 15 | 84 | 15,200 | 2.23 |
| Example 9 | Doma-C$_1$(1:33)24 h | Doma | MMA | 1:30 | 1:33 | 24 | 7 | 89 | 17,800 | 2.46 |
| Example 10 | Doma-C$_1$(1:100)24 h | Doma | MMA | 1:90 | 1:100 | 24 | 3 | 81 | 41,000 | 2.70 |
| Example 11 | Doma-C$_6$(1:10)24 h | Doma | HMA | 1:4 | 1:10 | 24 | 12 | 73 | 11,700 | 2.46 |
| Example 12 | Doma-C$_{12}$(1:6)24 h | Doma | DMA | 1:3 | 1:6 | 24 | 14 | 62 | 25,800 | 1.65 |
| Example 13 | Doma-Sty(1:10)24 h | Doma | Styrene | 1:7 | 1:10 | 24 | 18 | 31 | 9,300 | 1.17 |

<Production of Specimen and Evaluation of Rust Characteristics>

(Production of Disc Specimen)

Next, a Mg alloy rod (commercially available product, Mg—Al3%-Zn1% alloy, Mg alloy (AZ31), diameter 1.5 cm) was cut, and a Mg alloy disc was produced. The thickness was set to 4 mm.

Next, the Mg alloy disc was disposed to be superposed on a resin cut into a disc form, subsequently the Mg alloy disc was pressed in so as to be completely embedded in the thickness direction, and then the surface was polished. Thus, a disc specimen was produced.

Figure 13:
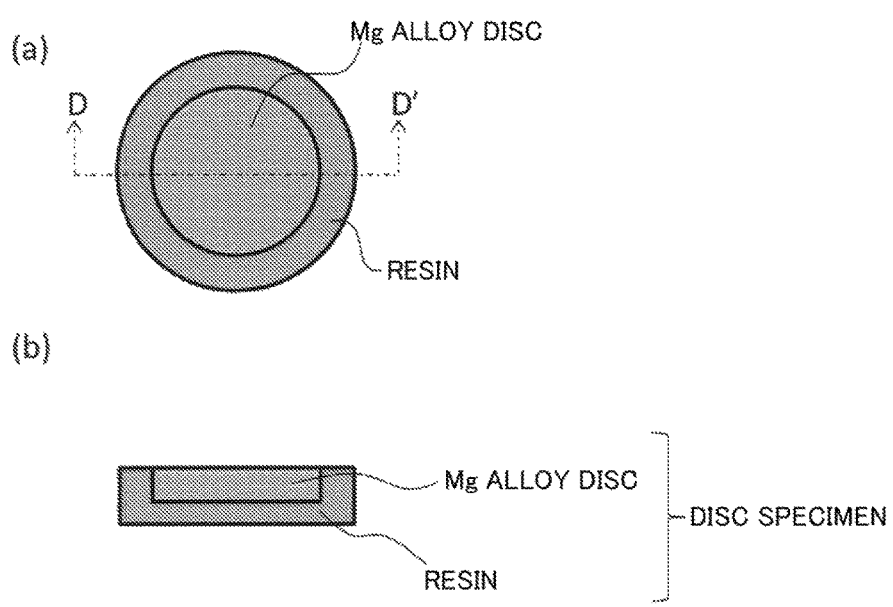
FIGS. 13(a) and 13(b) are schematic diagrams of a disc specimen, FIG. 13(a) being a plan view diagram, and FIG. 13(b) being a cross-section of (a) cut at the line D-D'.

FIGS. 13(a) and 13(b) show schematic diagrams of a disc specimen, in which FIG. 13(a) is a plan view diagram, and FIG. 13(b) is a cross-sectional view diagram of (a) cut at line D-D'.

Figure 14:
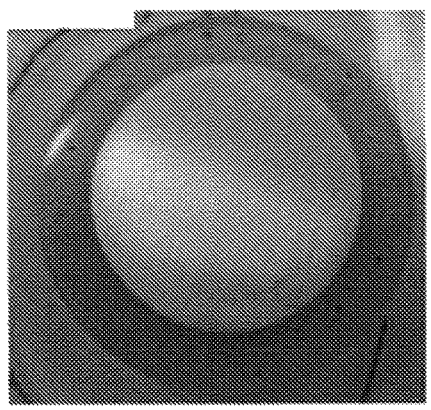
FIG. 14 is an optical photograph of a disc specimen.

FIG. 14 is an optical photograph of a disc specimen.

Production of Specimen of Example 1

Next, the sample of Example 1 was dispersed in THF at a proportion of 8 wt %, and a dispersion liquid was prepared.

Subsequently, the dispersion liquid 1 was spin coated so as to cover the exposed surface of Mg of the disc specimen. Spin coating was carried out under the conditions of (for 15 seconds at 1000 rpm, and subsequently for 30 seconds at 2500 rpm).

Next, the dispersion liquid was heated and maintained under the conditions of 60° C. and 1 hour and then dried, and thereby a specimen of Example 1 was produced.

Figure 15:
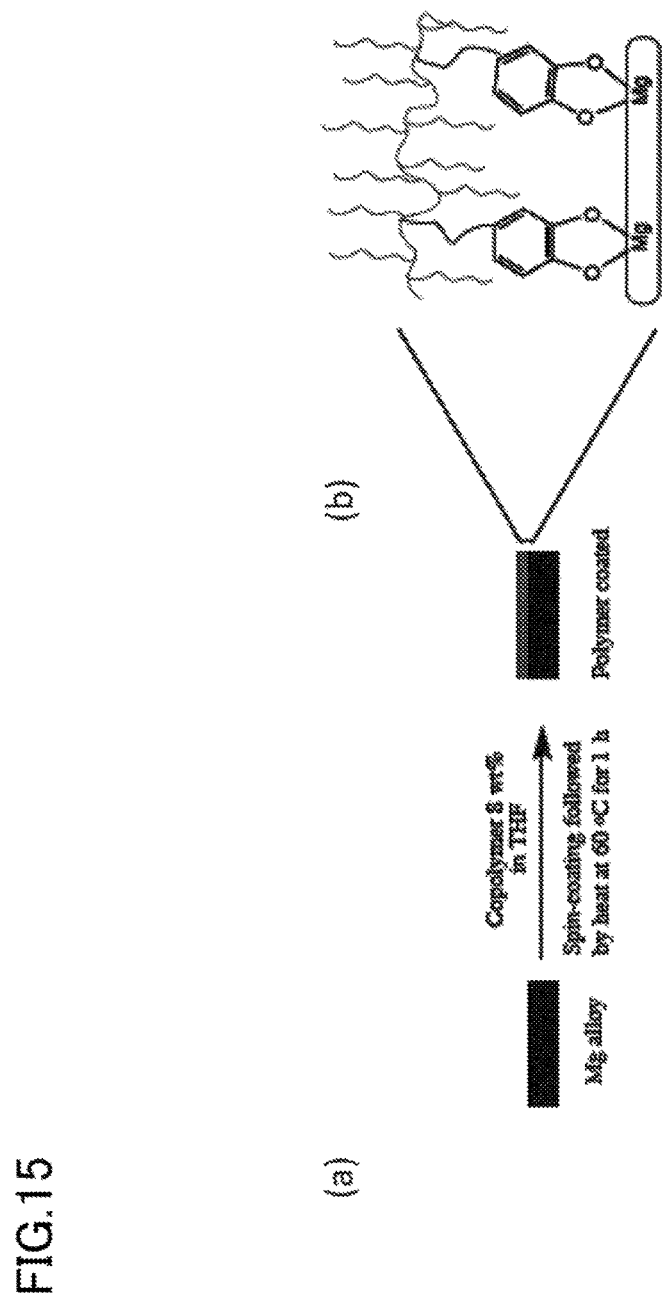
FIGS. 15(a) and 15(b) show a coating process explanatory diagram and an outline diagram of an adhered part of a coating film, respectively.

FIGS. 15(a) and 15(b) show an explanatory diagram for a coating process and a conceptual diagram of the adhesion part of a coating film, respectively.

As in the case of the explanatory diagram for a coating process, a 8 wt % solution of Copolymer in THF was spin coated on one surface of a substrate formed from a Mg alloy, and then the substrate was heated at 60° C. for 1 h. Thereby, a polymer coated substrate was produced.

In the conceptual diagram of the adhesion part of a coating film, the oxygen atoms of catechol groups of the polymer adhere to the substrate by being coordinate bonded to Mg atoms that constitute the substrate. It is illustrated that hydrophobic side chains of the polymer can stand close together and prevent the approach of water molecules and the like to the substrate surface.

Figure 16:
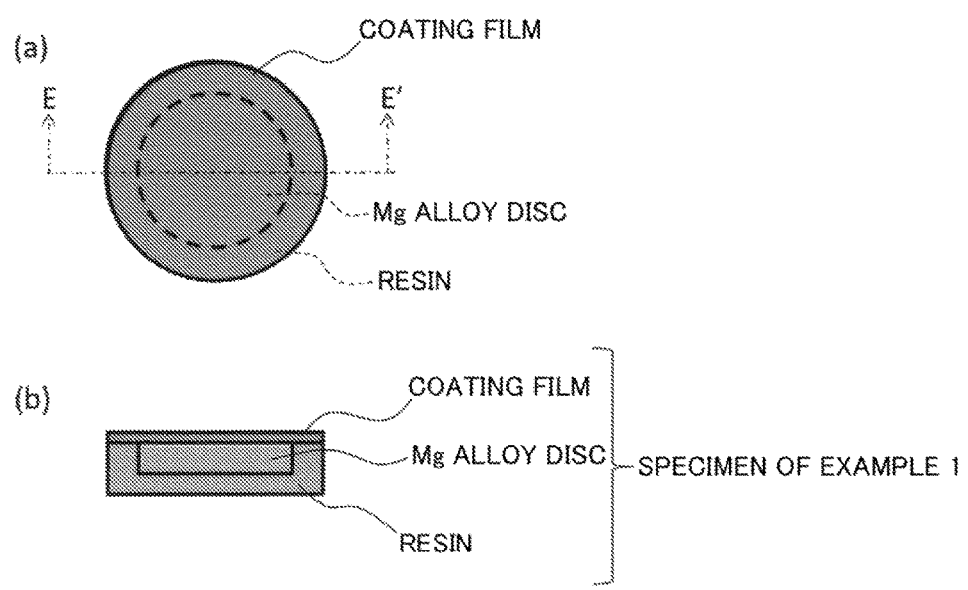
FIGS. 16(a) and 16(b) show schematic diagrams of the specimen of Example 1, FIG. 16(a) being a plan view diagram, while FIG. 16(b) being a cross-sectional view diagram of (a) cut at the line E-E'.

FIGS. 16(a) and 16(b) show schematic diagrams of the specimen of Example 1, in which FIG. 16(a) is a plan view diagram, and FIG. 16(b) is a cross-sectional view diagram of FIG. 16(a) cut at line E-E'.

The specimen of Example 1 was produced such that the bottom face and the side face of the Mg disc were completely covered by the resin, while the exposed surface was covered by a coating film, and the coating film was formed so as to also cover a portion of the resin, so that there was no exposed surface of the Mg disc. The film thickness of the coating film was 500 nm. Furthermore, it was confirmed by SEM observation that the coating film was a smooth film in which pores having a pore size of 50 nm or more were not formed.

Production of Specimens of Examples 2 to 13

Specimens of Examples 2 to 13 were produced in the same manner as in the case of the specimen of Example 1, except that the samples of Examples 2 to 13 were used.

Production of Specimen of Comparative Example 1

A disc specimen was used as a specimen of Comparative Example 1. This was a specimen intended for analyzing the conditions in which a coating film was not formed.

Production of Specimen of Comparative Example 2

A specimen of Comparative Example 2 was produced in the same manner as in the case of the specimen of Example 1, except that PMMA (polymethyl methacrylate resin) was used.
A film was formed using a 8 wt % PMMA solution.
(Evaluation of Rust Characteristics)

Figure 17:
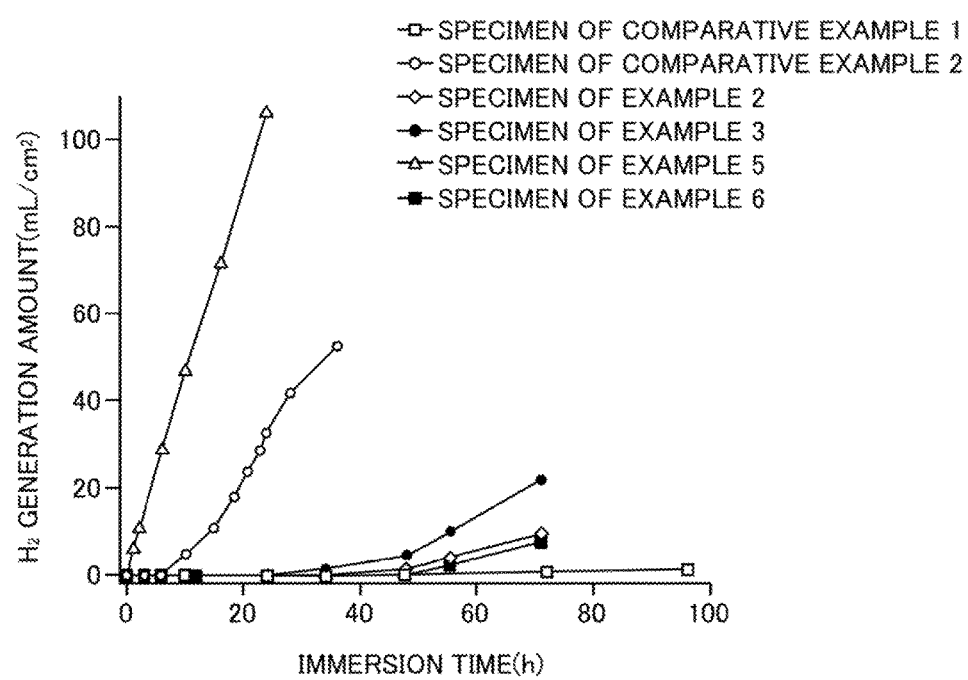
FIG. 17 is a graph illustrating the relations between the hydrogen generation amount of hydrogen generated when various specimens are immersed in an acidic aqueous buffer solution (pH 5), and the immersion time.

FIG. 17 is a graph illustrating the relations between the hydrogen generation amount of the hydrogen generated when various specimens were immersed in an acidic aqueous buffer solution (pH 5), and the immersion time.

In a case in which no coating film was provided (specimen of Comparative Example 1), hydrogen was generated at a rate of 110 mL/cm$^2$ for approximately 20 hours, and the substrate surface was almost rusted.

On the other hand, in a case in which the specimen was coated with a PMMA film (specimen of Comparative Example 2), an antirust effect was observed; however, hydrogen was generated at a rate of 55 mL/cm$^2$ for about 40 hours.

The specimen of Example 2, the specimen of Example 3, the specimen of Example 5, and the specimen of Example 6 exhibited antirust effects that were enhanced to a large extent compared to the specimens of Comparative Examples 1 and 2. Particularly, in the specimen of Example 5, hydrogen was generated only at a rate of 5 mL/cm$^2$ for about 95 hours, and a remarkable antirust effect was observed.

Figure 18:
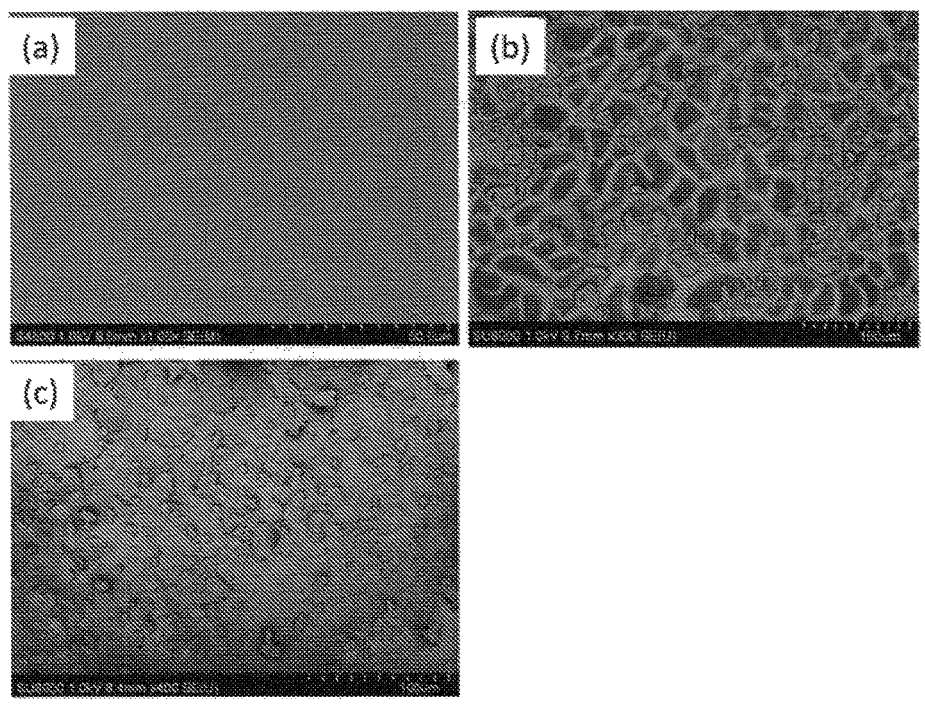
FIGS. 18(a) to 18(c) show SEM photographs of the surface in a case without a coating film, respectively corresponding to the cases of (a) immediately after polishing, (b) after immersion for 10 hours in an acidic (pH 5) buffer, and (c) after immersion for one day in a 3.5 wt % aqueous solution of NaCl.

FIGS. 18(a) to 18(c) show SEM photographs of the surface in the case without a coating film, corresponding to the cases of (a) immediately after polishing, (b) after immersion for 10 hours in an acidic (pH 5) buffer, and (c) after immersion for one day in a 3.5 wt % aqueous solution of NaCl.

Rust was observed at the surface not only in the case of being immersed in an acidic solvent, but also in the case of being immersed in an alkaline solvent.

Figure 19:
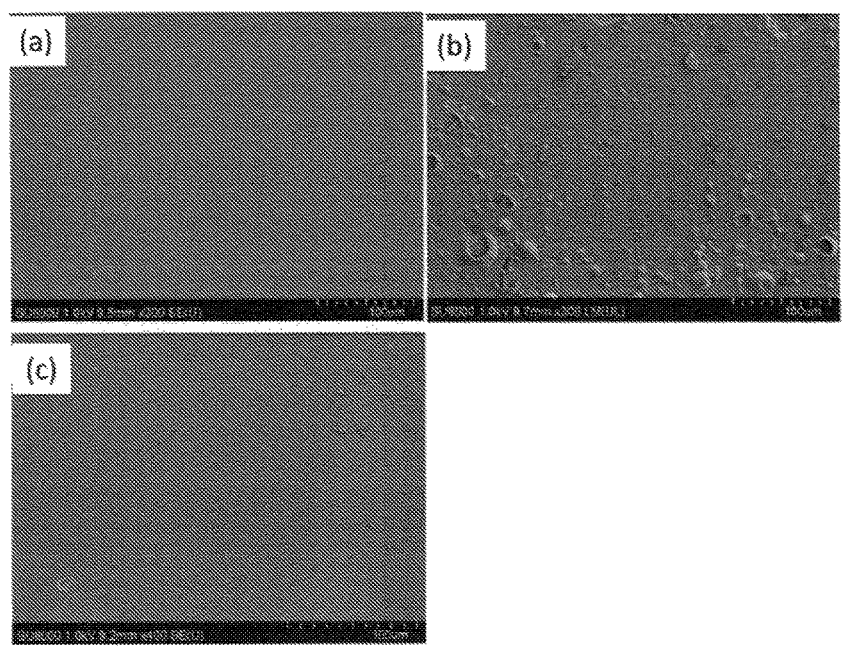
FIGS. 19(a) to 19(c) show SEM photographs of a substrate surface in a case in which a coating film (Copoly4b-8 wt % (specimen of Example 5)) was formed, respectively corresponding to the cases of (a) immediately after film formation, (b) after immersion for 4 days in an acidic (pH 5) buffer, and (c) after immersion for 4 days in a 3.5 wt % aqueous solution of NaCl.

FIGS. 19(a) to 19(c) show SEM photographs of a substrate surface in a case in which a coating film (specimen of Example 5) was formed, respectively corresponding to the cases of (a) immediately after film formation, (b) after immersion for 4 days in an acidic (pH 5) buffer, and (c) after immersion for 4 days in a 3.5 wt % aqueous solution of NaCl. In the case of the acidic solvent, rust was observed at the surface; however, in the case of the alkaline solvent, rust was hardly seen at the surface.

Furthermore, Table 2 is a table presenting the production conditions for the specimen of Example 1 to the specimen of Example 6, and the specimens of Comparative Examples 1 and 2, and the results of an evaluation for rust prevention.

TABLE 2

| | Coating film | | | Hydrogen generation amount when immersed in acidic solution (mL/cm$^2$) | | |
|---|---|---|---|---|---|---|
| | Material Material name | Coating method | Film thickness (nm) | Immersion for 20 hours | Immersion for 38 hours | Immersion for 60 hours |
| Specimen of Example 1 | Example 1 | Spincoating | 500 | — | — | — |
| Specimen of Example 2 | Example 2 | Spincoating | 500 | 1 | 1 | 15 |
| Specimen of Example 3 | Example 3 | Spincoating | 500 | 1 | 5 | 20 |
| Specimen of Example 4 | Example 4 | Spincoating | 500 | — | — | — |
| Specimen of Example 5 | Example 5 | Spincoating | 500 | 1 | 1 | 1 |
| Specimen of Example 6 | Example 6 | Spincoating | 500 | 1 | 3 | 9 |
| Specimen of Comparative Example 1 | — | — | — | 110 | — | — |

TABLE 2-continued

| | Coating film | | | Hydrogen generation amount when immersed in acidic solution (mL/cm$^2$) | | |
|---|---|---|---|---|---|---|
| | Material Material name | Coating method | Film thickness (nm) | Immersion for 20 hours | Immersion for 38 hours | Immersion for 60 hours |
| Specimen of Comparative Example 2 | PMMA | Spincoating | 500 | 20 | 45 | — |

Production of Specimen of Example 7 (Dip)

(Production of Disc Specimen)

Next, a Mg alloy rod (commercially available product, Mg—Al 3%-Zn 1% alloy, Mg alloy (AZ31), diameter 1.5 cm) was cut, and a Mg alloy disc was produced. The thickness was set to 4 mm.

Next, the surface was wiped with SiC paper and was subjected to a cleaning treatment with EtOH, $H_2O$, and acetone in this order. Thus, a disc specimen was produced.

Next, the sample of Example 7 was dispersed in DMF at a proportion of 2 mg/mL, and a dispersion liquid was prepared.

Next, a disc specimen was immersed in the dispersion liquid that was heated to 60° C. for 6 hours, and then the disc specimen was pulled out, washed, and dried. Thereby, a specimen of Example 7 (dip) having the surface coated in Example 7 was produced.

Figure 20:
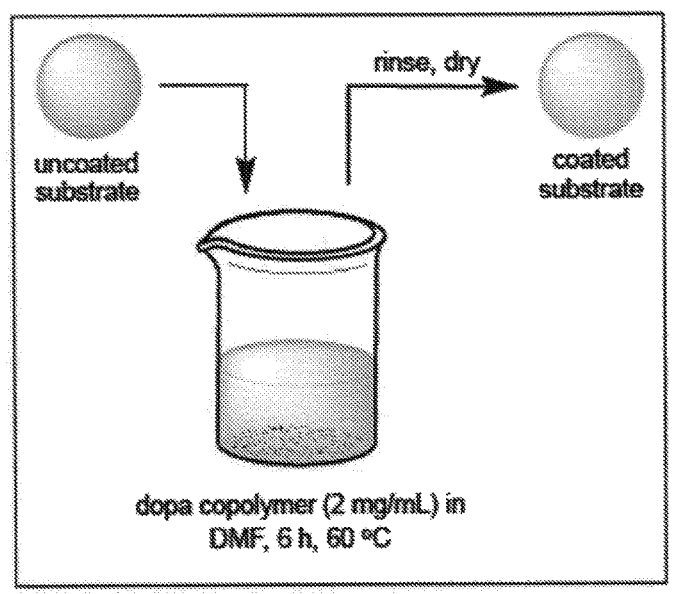
FIG. 20 is an outline explanatory diagram for this dip-coating method.

FIG. 20 is an explanatory diagram for this dip-coating method.

Surface Evaluation of Specimen of Example 7 (Dip)

Figure 21:
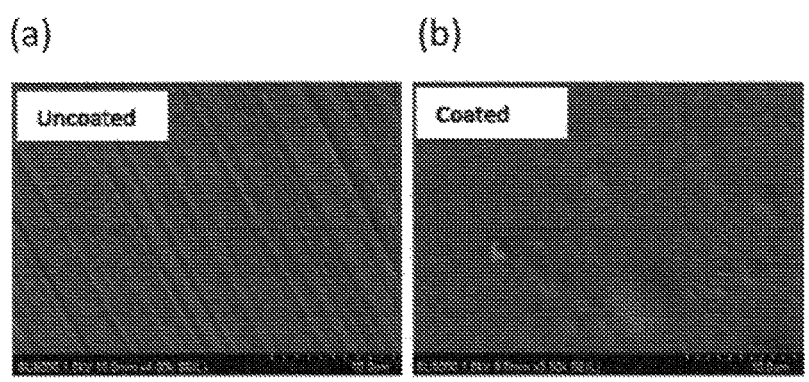
FIGS. 21(a) and 21(b) show SEM image photographs of the surface of the specimen of Example 7 (dip), respectively corresponding to the cases of (a) before surface coating, and (b) after surface coating.

First, the surface was observed by SEM. FIGS. 21(a) and 21(b) show SEM image photographs of the surface of the specimen of Example 7 (dip), respectively corresponding to the cases of (a) before surface coating and (b) after surface coating.

Figure 22:
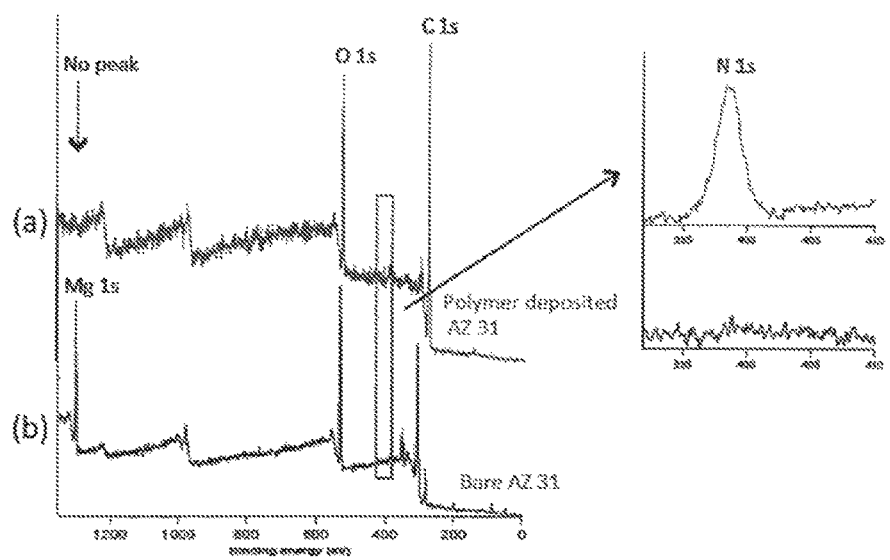
FIG. 22 is the XPS spectrum of the surface of the specimen of Example 7 (dip).

Next, the surface was subjected to an XPS analysis. FIG. 22 is the XPS spectrum of the surface of the specimen of Example 7 (dip). Polymer deposited AZ31 (b) represents the XPS spectrum of the surface of the specimen of Example 7 (dip), and Bare AZ31 (a) represents the XPS spectrum of the specimen of Comparative Example 1 measured for a comparison.

From these results of surface evaluations, it could be confirmed that despite having a thin film thickness, the polymer of the sample of Example 7 strongly adhered to the metal surface as a result of an interaction between catechol and $Mg^{2+}$ at the surface of a Mg alloy oxide film. This suggests that since there appears a N1s peak originating from the nitrogen contained in an amide bond (NHCO) that is contained in the sample specimen, the sample specimen was adhered to the surface of the Mg alloy oxide film.

Production of Specimen of Example 7 (Spin)

(Production of Disc Specimen)

After a disc specimen was produced, a film was formed thereon according to a spin coating method, and this was subjected to a heating and drying treatment at 60° C. Thus, a specimen of Example 7 (spin) was produced. The conditions for the film-forming process were (for 15 seconds at 1000 rpm, and subsequently for 30 seconds at 2500 rpm).

The polymer film of the sample of Example 7 of the specimen of Example 7 (spin) was transparent and was stable even in air.

Meanwhile, in order to clarify the relations between concentration and film thickness, dispersion liquids having different concentrations of the sample of Example 7 were produced, the dispersion liquids were spin coated under the same conditions, and the film thicknesses were measured using a surface profiler (DEKTAK). It was found that the film thickness was dependent on the concentration of the sample of Example 7 in a dispersion liquid.

Figure 23:
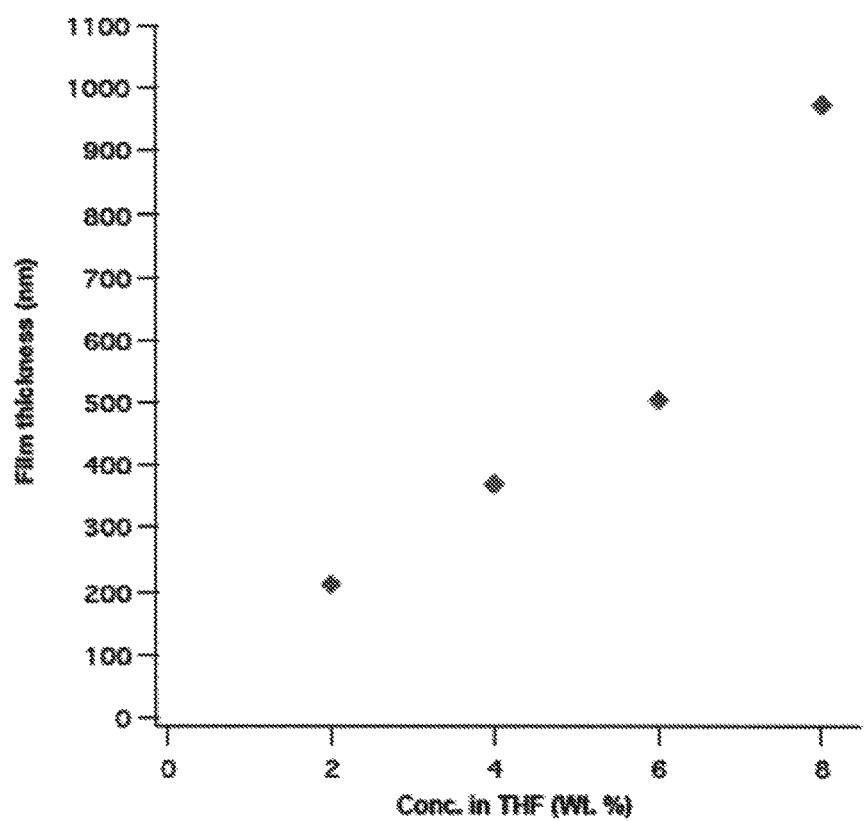
FIG. 23 is a graph illustrating the relations between the sample concentration in the dispersion liquid and the film thickness.

FIG. 23 is a graph illustrating the relations between the sample concentration in a dispersion liquid and the film thickness.

Production of Specimen of Example 11 (Spin)

A specimen of Example 11 (spin) was produced in the same manner as in the case of the specimen of Example 7 (spin), except that the sample of Example 11 was used.

Production of Specimen of Example 12 (Spin)

A specimen of Example 12 (spin) was produced in the same manner as in the case of the specimen of Example 7 (spin), except that the sample of Example 12 was used.

Table 3 presents the production conditions for the various specimens.

TABLE 3

| | Material name | abbreviation | Coating method |
|---|---|---|---|
| Specimen of Example 7 (dip) | Example 7 | Doma-C$_1$(1:7)24 h | Dipcoating |
| Specimen of Example 7 (spin) | Example 7 | Doma-C$_1$(1:7)24 h | Spincoating |
| Specimen of Example 11 (spin) | Example 11 | Doma-C$_6$(1:10)24 h | Spincoating |
| Specimen of Example 12 (spin) | Example 12 | Doma-C$_{12}$(1:6)24 h | Spincoating |

(Evaluation of Rust Characteristics Based on Immersion in Acidic Aqueous Solution (pH 5))

($H_2$ Generation Amount)

Next, the specimens of Example 7 (spin), 11 (spin) and 12 (spin) and Comparative Examples 1 and 2 were respectively immersed for a long time in an acidic aqueous solution (pH 5), and measurement of the $H_2$ generation amounts was carried out.

Figure 24:
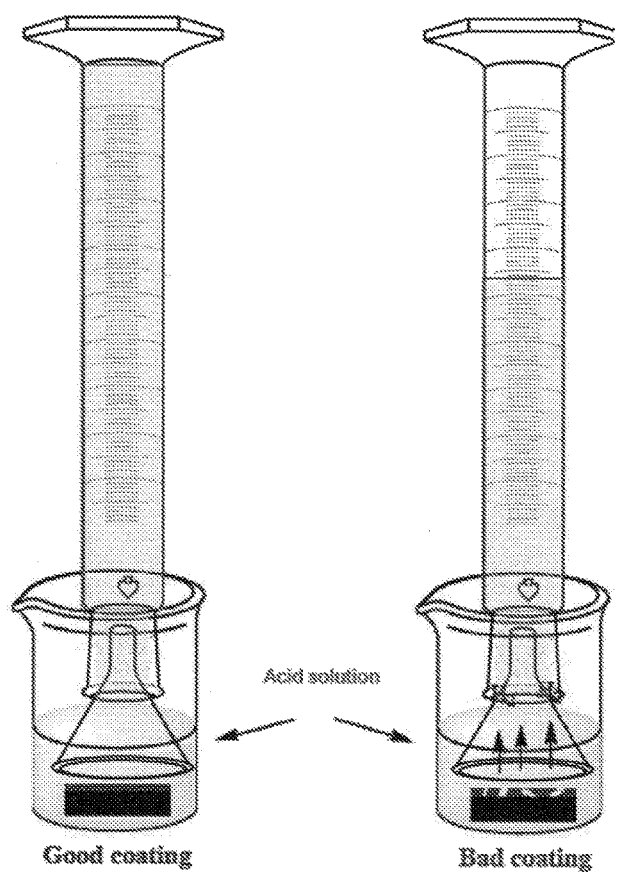
FIG. 24 is an outline explanatory diagram for the measurement of the amount of $H_2$ generation.

FIG. 24 is an explanatory diagram for the measurement of the $H_2$ generation amount.

Figure 25:
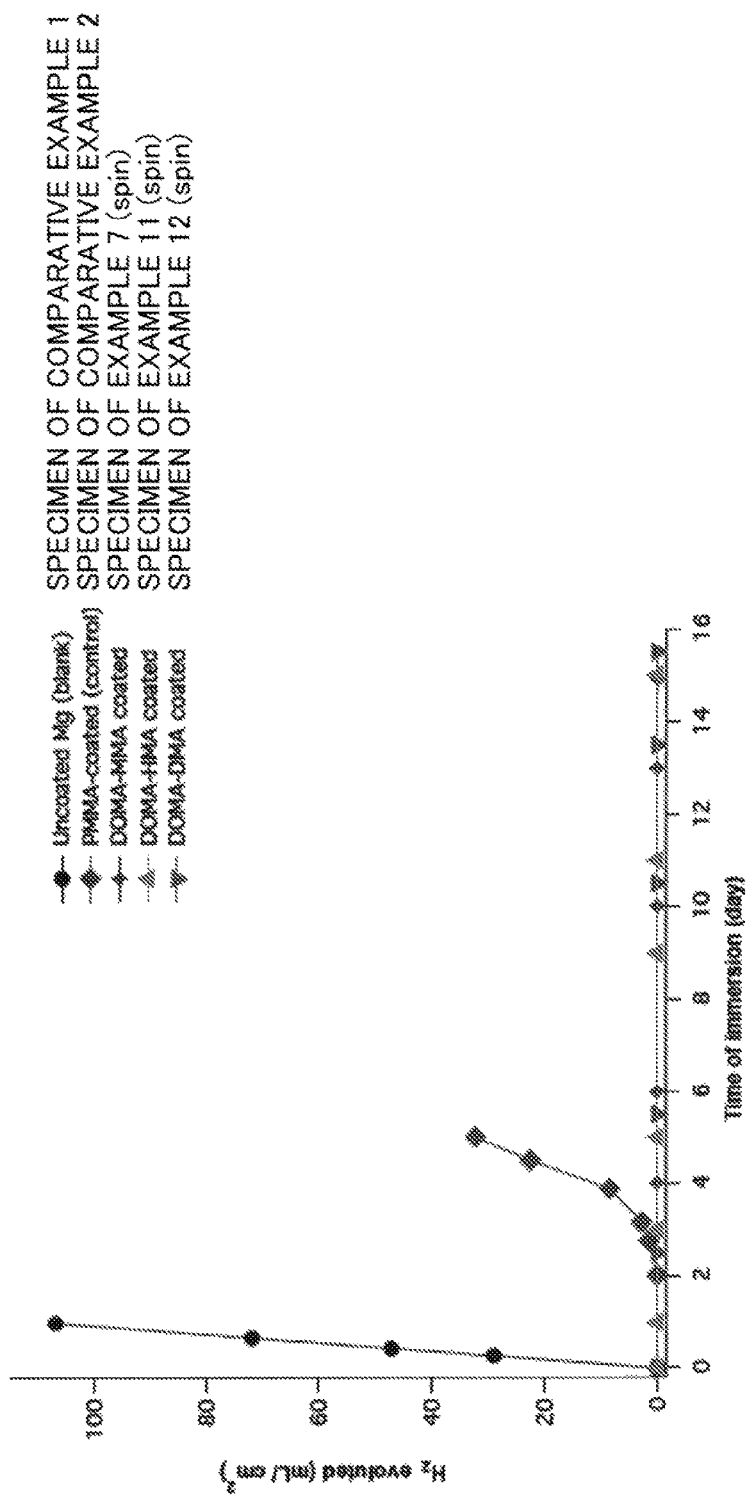
FIG. 25 is a graph illustrating the relations between the immersion time and the amount of $H_2$ generation for a specimen immersed in an acidic aqueous solution (pH 5), the graph showing the dependency of the material.

FIG. 25 is a graph illustrating the relations between the immersion time for a specimen that has been immersed in an acidic aqueous solution (pH 5), and the $H_2$ generation amount, and this graph illustrates dependency of the material.

The specimens of Example 7 (spin), 11 (spin) and 12 (spin) had smaller $H_2$ generation amounts compared to the specimens of Comparative Examples 1 and 2, and the metal surface protecting effect was clearly enhanced.

(Partial SEM Image and Digital Photograph of Whole)

Figure 26:
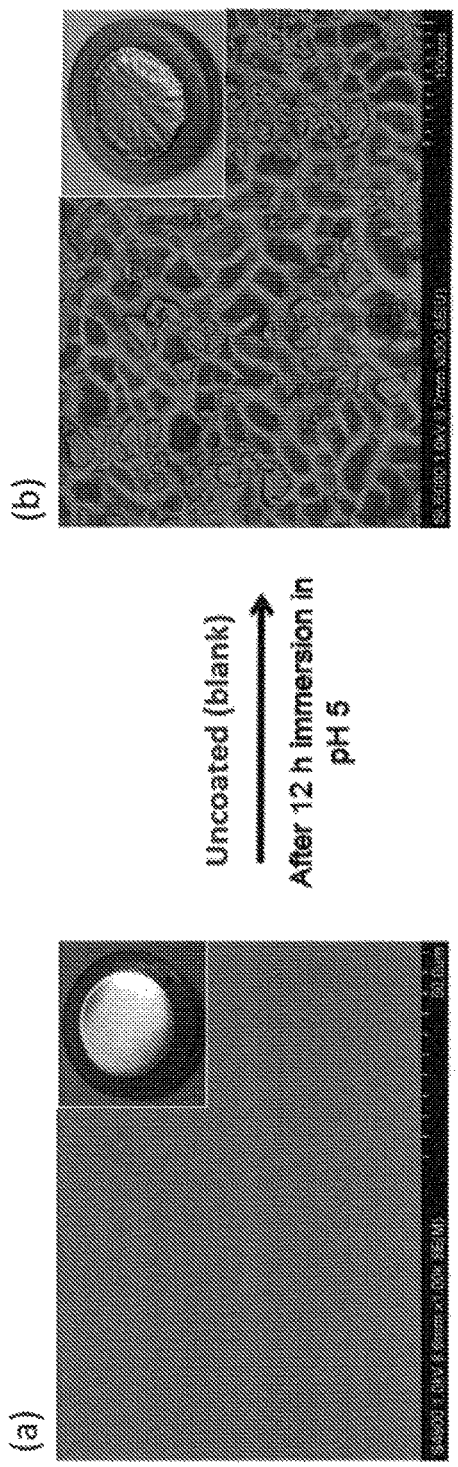
FIGS. 26(a) and 26(b) show SEM images of portions of the specimen (Uncoated) of Comparative Example 1, respectively corresponding to the cases of (a) before immersion in an acidic aqueous solution (pH 5), and (b) after immersion for 12 hours.

FIGS. 26(a) and 26(b) show SEM images of portions of the specimen (Uncoated) of Comparative Example 1, respectively corresponding to the cases of (a) before immersion in an acidic aqueous solution (pH 5), and (b) after immersion for 12 hours. Inserted diagrams are digital photographs of the whole specimen. In the specimen of Comparative Example 1, fine cracks were generated over the entire surface as a result of immersion in an acidic aqueous solution (pH 5) for 12 hours.

Figure 27:
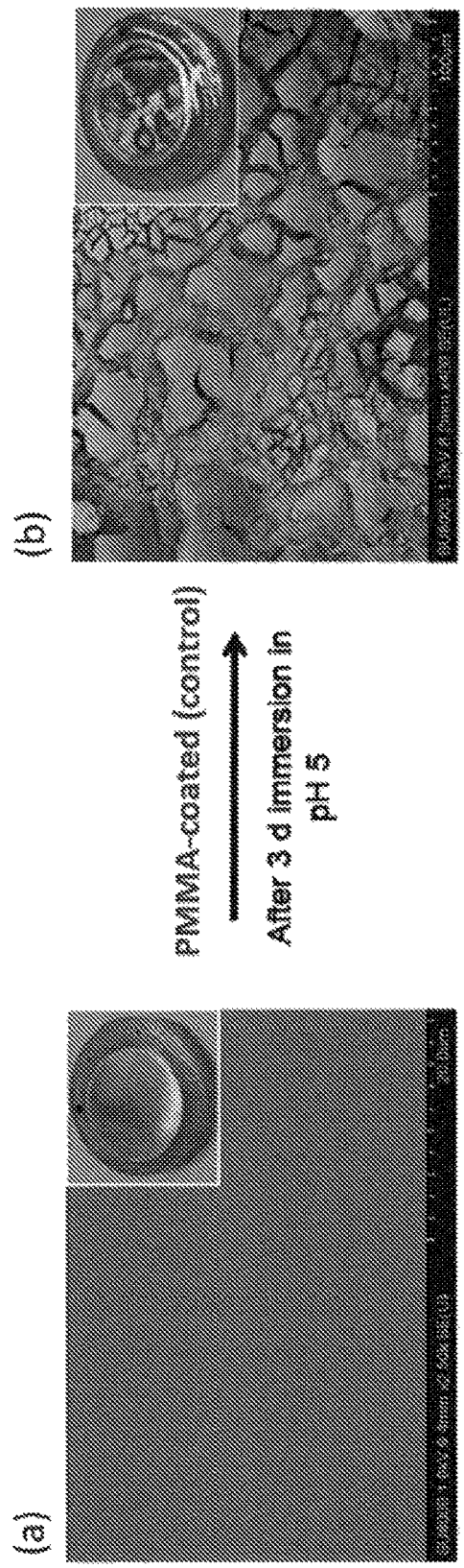
FIGS. 27(a) and 27(b) show SEM images of portions of the specimen (PMMA-coated) of Comparative Example 2, respectively corresponding to the cases of (a) before immersion in an acidic aqueous solution (pH 5), and (b) after immersion for 12 hours.

FIGS. 27(a) and 27(b) show SEM images of portions of the specimen (PMMA-coated) of Comparative Example 2, respectively corresponding to the cases of (a) before immersion in an acidic aqueous solution (pH 5), and (b) after immersion for 12 hours. Inserted diagrams are digital photographs of the whole specimen. In the specimen of Comparative Example 2, large cracks were generated over the entire surface as a result of immersion in an acidic aqueous solution (pH 5) for 3 days.

Figure 28:
FIGS. 28(a) and 28(b) show SEM images of portions of the specimen (DOMA-MMA coated) of Example 7 (spin), respectively corresponding to the cases of (a) before immersion in an acidic aqueous solution (pH 5), and (b) after immersion for 12 hours.

FIGS. 28(a) and 28(b) show SEM images of portions of the specimen (DOMA-MMA coated) of Example 7 (spin), respectively corresponding to the cases of (a) before immersion in an acidic aqueous solution (pH 5), and (b) after immersion for 12 hours. Inserted diagrams are digital photographs of the whole specimen. In the specimen of Example 7 (spin), even after the specimen had been immersed in an acidic aqueous solution (pH 5) for 15 days, no change was observed at the surface.

(Digital Photograph of Whole Specimen in Cross-Cut Test)

Next, cross-cuts were inserted respectively into the specimen of Example 7 (spin) and the specimen of Comparative Example 2, the specimens were immersed in an acidic aqueous solution (pH 5) for a long time period, and the $H_2$ generation amounts were measured.

Figure 29:
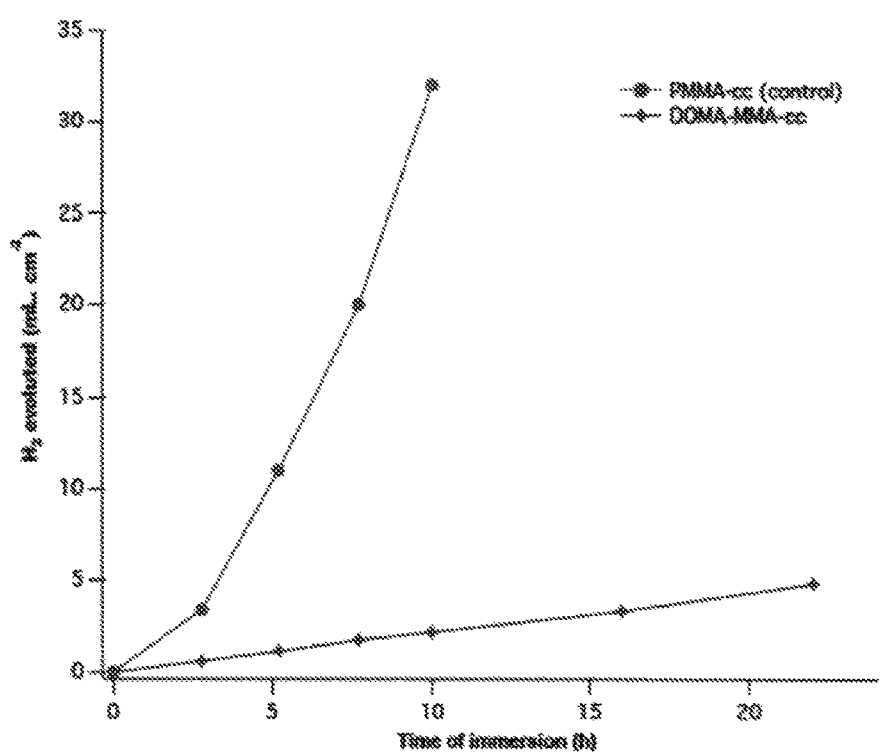
FIG. 29 is a graph illustrating the relations between the immersion times and the amounts of $H_2$ generation for the specimen (DOMA-MMA) of Example 7 (spin) and the specimen (PMMA) of Comparative Example 2.

FIG. 29 is a graph illustrating the relations between the immersion times and the $H_2$ generation amounts of the specimen (DOMA-MMA) of Example 7 (spin) and the specimen (PMMA) of Comparative Example 2.

Compared to the specimen (PMMA) of Comparative Example 2, the $H_2$ generation amount of the specimen (DOMA-MMA) of Example 7 (spin) was lowered.

Figure 30:
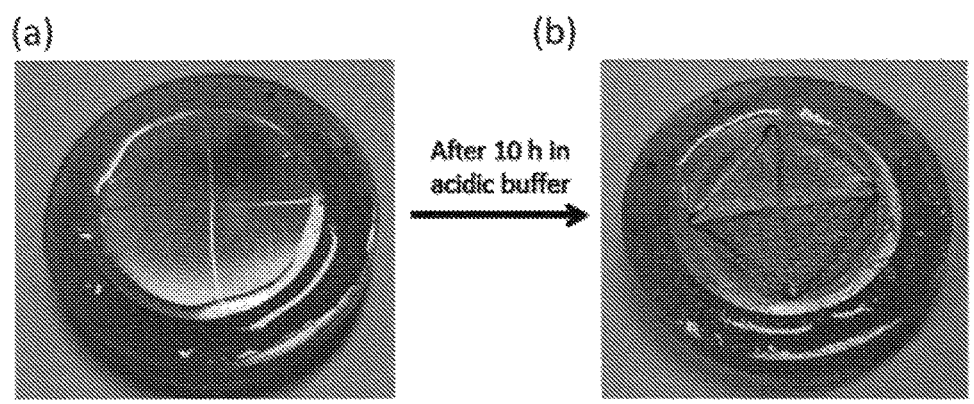
FIGS. 30(a) and 30(b) show digital photographs of the whole specimen (PMMA) of Comparative Example 2, respectively corresponding to the cases of (a) before immersion in an acidic aqueous solution (pH 5), and (b) after immersion for 10 hours.

FIGS. 30(a) and 30(b) show digital photographs of the whole specimen (PMMA) of Comparative Example 2, respectively corresponding to the cases of (a) before immersion in an acidic aqueous solution (pH 5), and (b) after immersion for 10 hours. In the specimen of Comparative Example 2, the entire surface was discolored after being immersed in an acidic aqueous solution (pH 5) for 10 hours.

Figure 31:
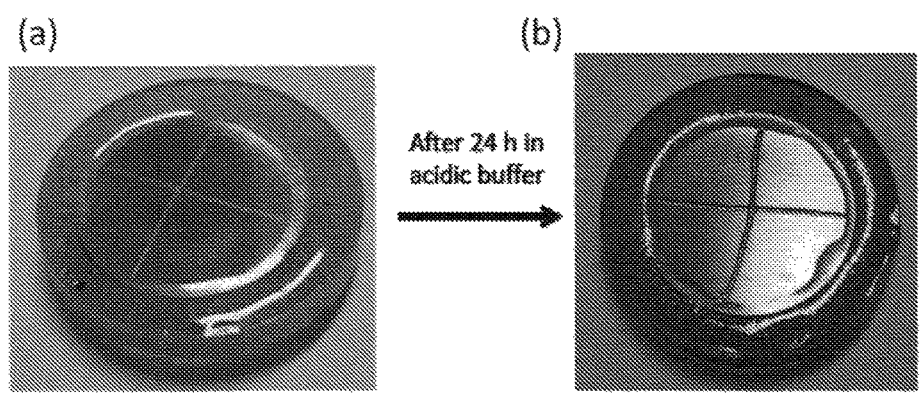
FIGS. 31(a) and 31(b) show digital photographs of the whole specimen (DOMA-MMA) of Example 7 (spin), respectively corresponding to the cases of (a) before immersion in an acidic aqueous solution (pH 5), and (b) after immersion for 24 hours.

FIGS. 31(a) and 31(b) show digital photographs of the whole specimen (DOMA-MMA) of Example 7 (spin), respectively corresponding to the cases of (a) before immersion in an acidic aqueous solution (pH 5), and (b) after immersion for 24 hours. In the specimen of Example 7 (spin), even after the specimen had been immersed in an acidic aqueous solution (pH 5) for 24 hours, there were hardly any changes seen at the surface.

(Evaluation of Rust Characteristics Based on Immersion in Acidic Aqueous Solution (pH 5))

(Partial SEM Image and Digital Photograph of Whole)

Figure 32:
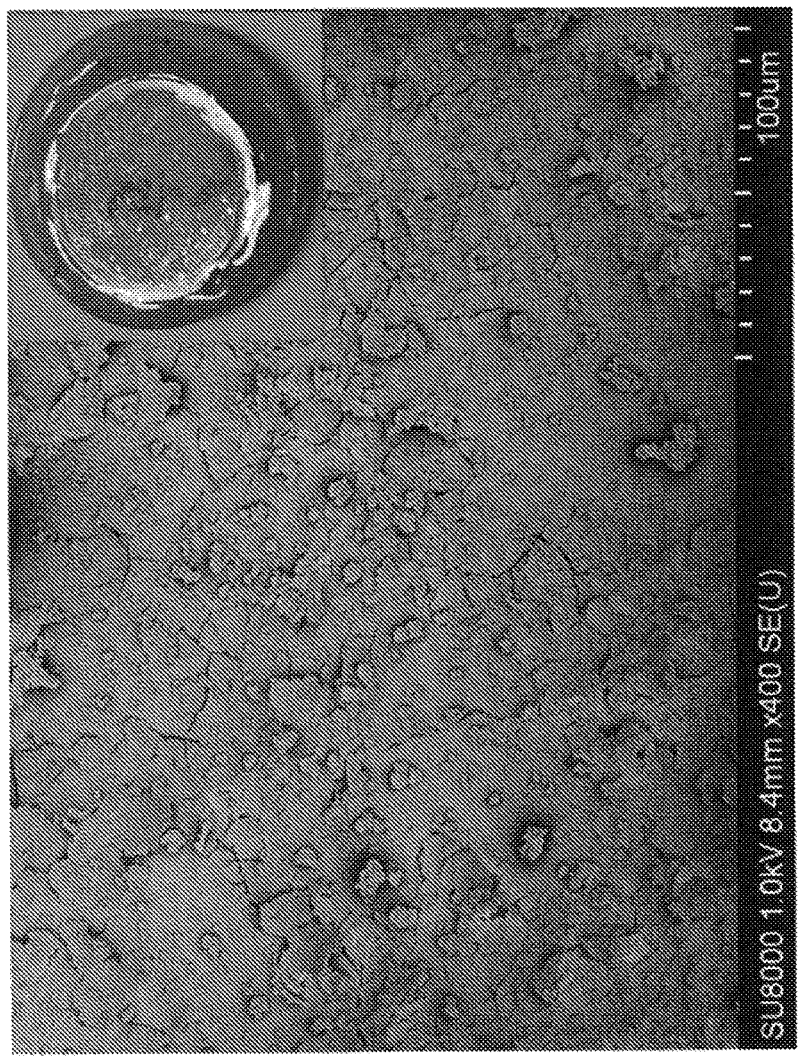
FIG. 32 is a SEM image of a portion of the specimen (Uncoated) of Comparative Example 1, obtained after immersion in a 3.5 wt % NaCl solution for 3 days.

FIG. 32 is a SEM image of a portion of the specimen (Uncoated) of Comparative Example 1, which was obtained after immersion in a 3.5 wt % NaCl solution for 3 days. The inserted diagram is a digital photograph of the whole specimen. In the specimen of Comparative Example 1, fine cracks were generated over the entire surface as a result of immersion in a 3.5 wt % NaCl solution for 3 days.

Figure 33:
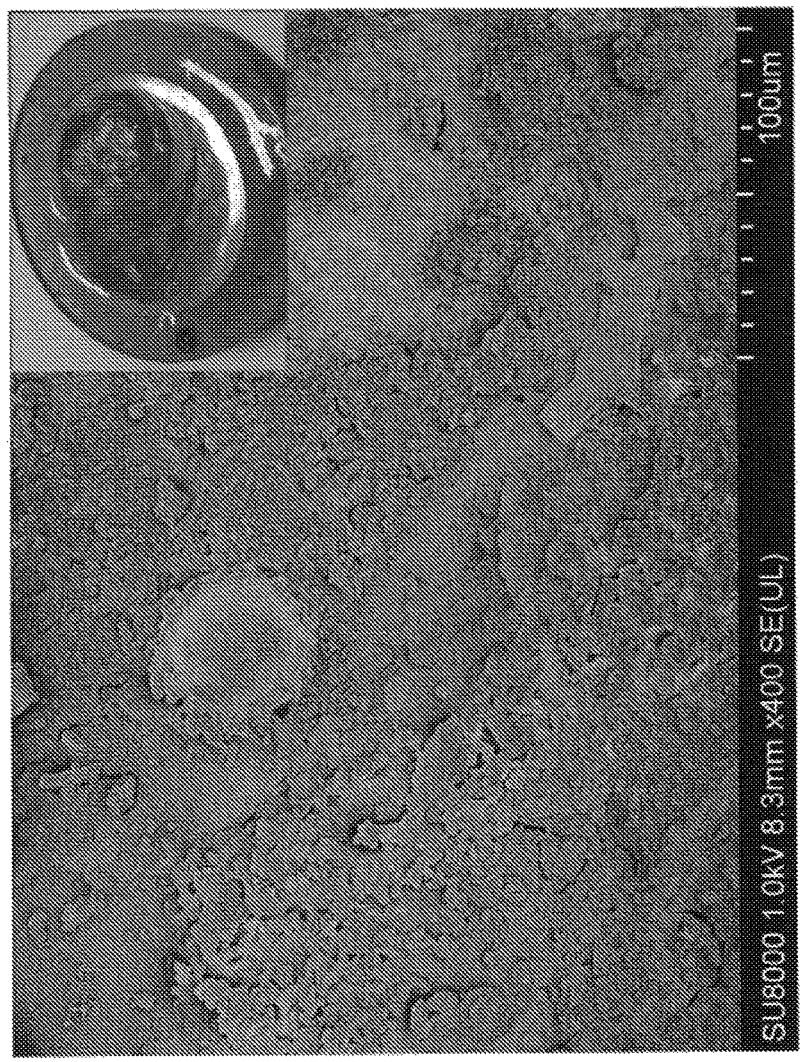
FIG. 33 is a SEM image of a portion of the specimen (PMMA) of Comparative Example 2, obtained after immersion in a 3.5 wt % NaCl solution for 3 days.

FIG. 33 is a SEM image of a portion of the specimen (PMMA) of Comparative Example 2, which was obtained after immersion in a 3.5 wt % NaCl solution for 3 days. The inserted diagram is a digital photograph of the whole specimen. Fine cracks were generated over the entire surface.

Figure 34:
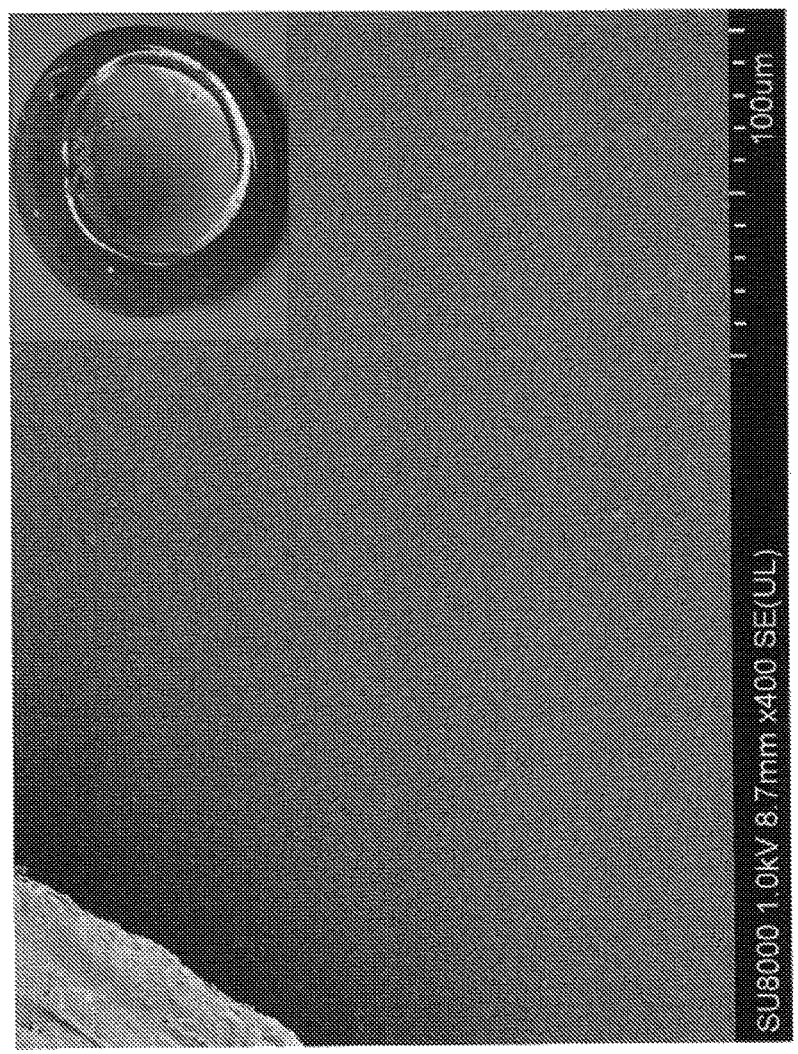
FIG. 34 is a SEM image of a portion of the specimen (DOMA-MMA) of Example 7 (spin), obtained after immersion in a 3.5 wt % NaCl solution for 3 days.

FIG. 34 is a SEM image of a portion of the specimen (DOMA-MMA) of Example 7 (spin), which was obtained after immersion in a 3.5 wt % NaCl solution for 3 days. The inserted diagram is a digital photograph of the whole specimen. There were hardly any changes seen at the surface.

(Digital Photograph of Whole Specimen in Cross-Cut Test)

Next, cross-cuts were inserted respectively into the specimen of Example 7 (spin) and the specimen of Comparative Example 2, and the specimens were immersed in a 3.5 wt % NaCl solution for 2 days.

Figure 35:
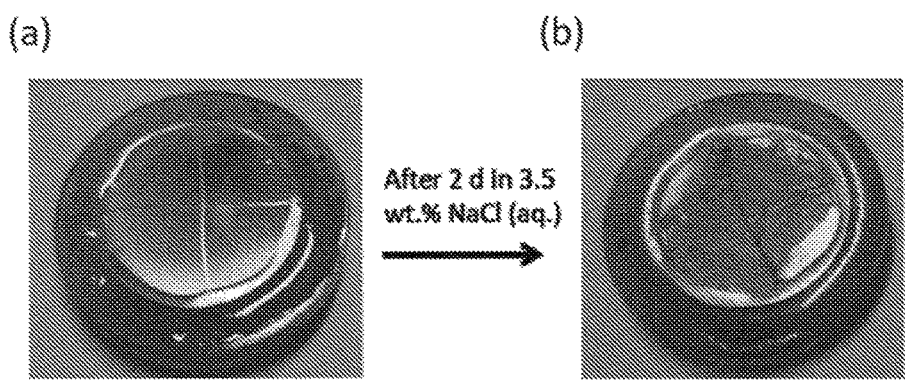
FIGS. 35(a) and 35(b) show digital photographs of the whole specimen (PMMA) of Comparative Example 2, respectively corresponding to the cases of (a) before immersion in a 3.5 wt % NaCl solution, and (b) after immersion for 2 days.

FIGS. 35(a) and 35(b) show digital photographs of the whole specimen (PMMA) of Comparative Example 2, respectively corresponding to the cases of (a) before immersion in a 3.5 wt % NaCl solution, and (b) after immersion for 2 days. In the specimen of Comparative Example 2, even after the specimen had been immersed in a 3.5 wt % NaCl solution for 2 days, there were hardly any changes seen at the surface.

Figure 36:
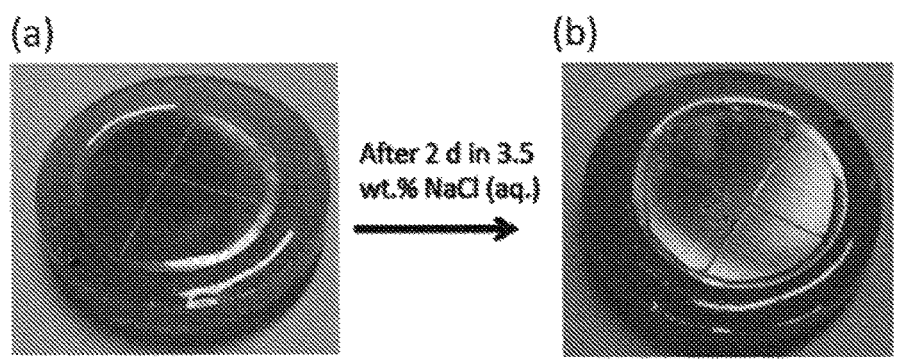
FIGS. 36(a) and 36(b) show digital photographs of the whole specimen (DOMA-MMA) of Example 7 (spin), respectively corresponding to the cases of (a) before immersion in a 3.5 wt % NaCl solution, and (b) after immersion for 2 days.

FIGS. 36(a) and 36(b) show digital photographs of the whole specimen (DOMA-MMA) of Example 7 (spin), respectively corresponding to the cases of (a) before immersion in a 3.5 wt % NaCl solution, and (b) after immersion for 2 days. In the specimen of Example 7 (spin), even after the specimen had been immersed in a 3.5 wt % NaCl solution for 2 days, there were hardly any changes at the surface.

(Electrochemical Corrosion Test)

Next, an electrochemical corrosion test was carried out.

First, a specimen electrode unit was produced by insulating surfaces other than the measurement surface.

Figure 37:
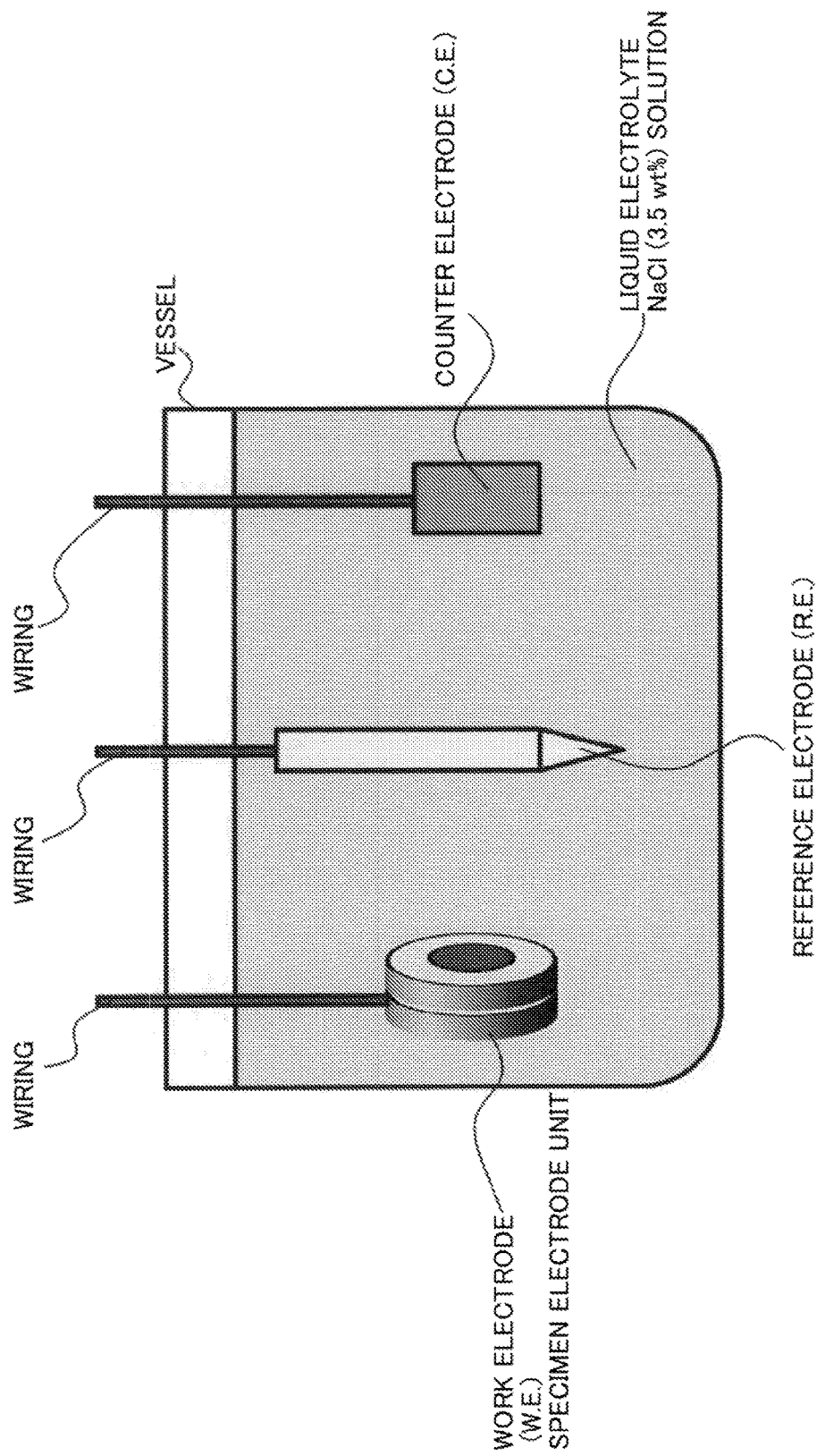
FIG. 37 is an outline explanatory diagram of an electrochemical corrosion test.

FIG. 37 is an explanatory diagram for an electrochemical corrosion test.

As illustrated in FIG. 37, a specimen electrode unit is immersed in a liquid electrolyte (3.5 wt % NaCl solution) contained in a vessel, together with a reference electrode (R.E.) and a counter electrode (C.E.). The respective electrodes are connected to a potentio-galvanostat (not shown in the diagram) through wiring.

As illustrated in the explanatory diagram, after the specimen electrode unit was attached, the system was left to stand for 10 minutes, and the corrosion current was measured from the spontaneous potential by linear sweep voltammetry (L.S.V.) at a scan rate of 1 mV/sec.

Figure 38:
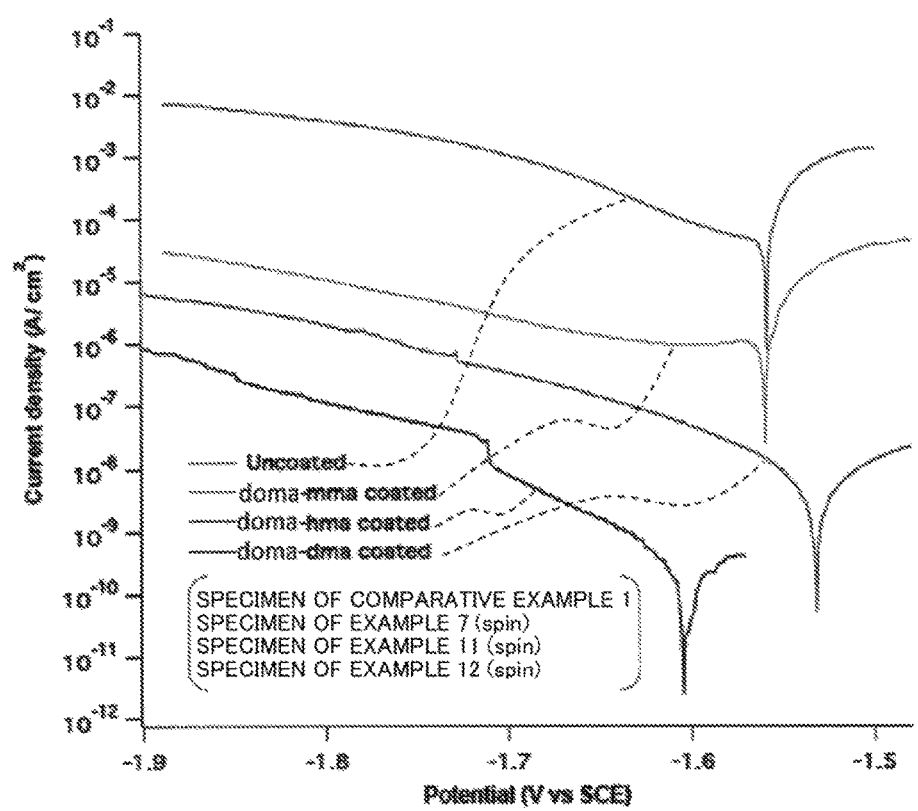
FIG. 38 is a graph illustrating the results of an electrochemical corrosion test for the specimen (Uncoated) of Comparative Example 1, the specimen (DOMA-MMA) of Example 7 (spin), the specimen (DOMA-HMA) of Example 11 (spin), and the specimen (DOMA-DMA) of Example 12 (spin), the graph showing the V-I (cathodic current) characteristics in a 3.5 wt % NaCl solution.

FIG. 38 is a graph illustrating the results of an electrochemical corrosion test for the specimen (Uncoated) of Comparative Example 1, the specimen (DOMA-MMA) of Example 7 (spin), the specimen (DOMA-HMA) of Example 11 (spin), and the specimen (DOMA-DMA) of Example 12 (spin), the graph showing the V-I (cathodic current) characteristics in a 3.5 wt % NaCl solution.

In regard to the specimen (Uncoated) of Comparative Example 1, it was considered that $H_2O$ was electrolyzed at the metal surface, electrons were taken into the electrode, and a large current flowed. On the other hand, in regard to the coated specimen, it was speculated that no significant current flowed through the specimen, and the electrolysis reaction of $H_2O$ was suppressed.

Figure 39:
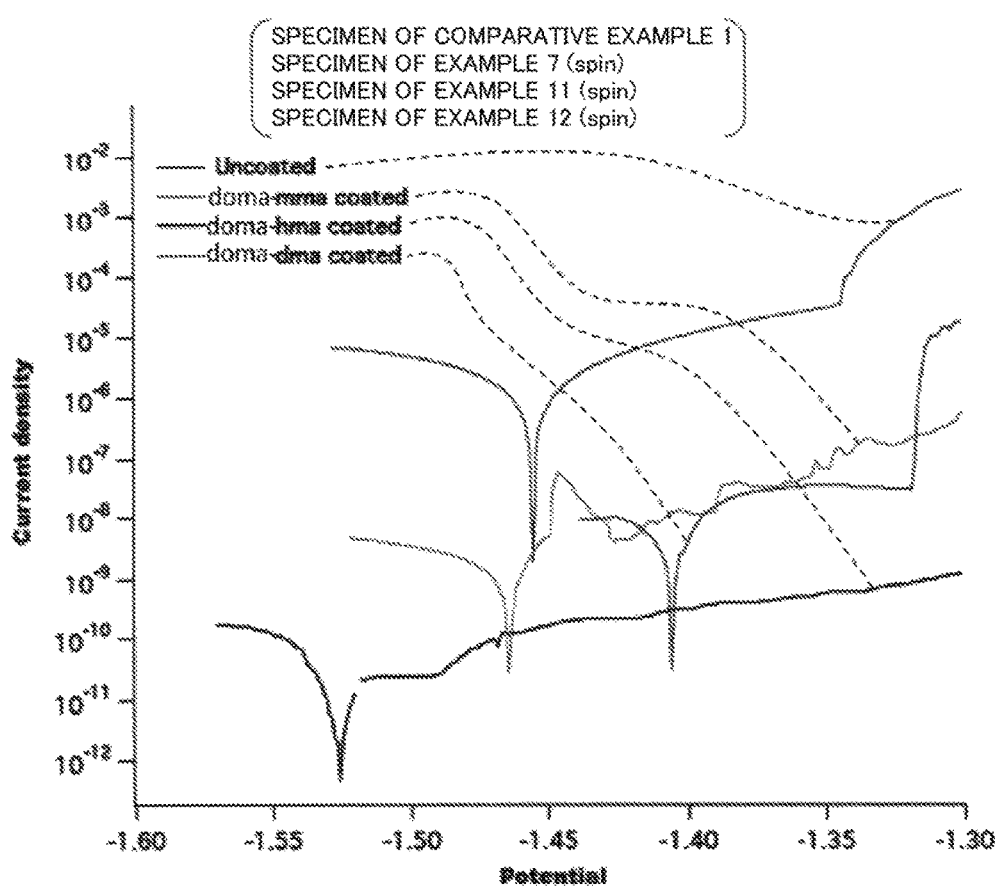
FIG. 39 is a graph illustrating the results of an electrochemical corrosion test for the specimen (Uncoated) of Comparative Example 1, the specimen (DOMA-MMA) of Example 7 (spin), the specimen (DOMA-HMA) of Example 11 (spin), and the specimen (DOMA-DMA) of Example 12 (spin), the graph showing the V-I (anodic current) characteristics in a 3.5 wt % NaCl solution.

FIG. 39 is a graph illustrating the results of an electrochemical corrosion test for the specimen (Uncoated) of Comparative Example 1, the specimen (DOMA-MMA) of Example 7 (spin), the specimen (DOMA-HMA) of Example 11 (spin), and the specimen (DOMA-DMA) of Example 12 (spin), the graph showing the V-I (anodic current) characteristics in a 3.5 wt % NaCl solution.

In regard to the specimen (Uncoated) of Comparative Example 1, it was considered that Mg began to dissolve at the metal surface and supplied electrons, and thus a large current flowed. On the other hand, in regard to the coated specimen, it was speculated that no significant current flowed through the specimen, and the dissolution reaction of Mg was suppressed.

(Production of Specimen, Evaluation of Rust Characteristics, and Evaluation of Dependency on Metal Material)

(Production of Disc Specimen)

First, a Mg alloy rod (commercially available product, Mg—Al 3%-Zn 1% alloy, Mg alloy (AZ31), diameter 1.5 cm) was cut, and a Mg alloy disc was produced.

Similarly to this, a pure Cu rod (commercially available product, Cu-(99.9)%, diameter 1.5 cm) was cut, and a pure Cu disc was produced.

Furthermore, a pure Al rod (commercially available product, Al-(99)%, diameter 1.5 cm) was cut, and a pure Al disc was produced. Furthermore, a pure Fe rod (commercially available product, Fe-(99.9)%, diameter 1.5 cm) was cut, and a pure Fe disc was produced. The thicknesses of the various discs were set to 4 mm.

Next, the Mg alloy disc was disposed to be superposed on a resin cut into a disc form, subsequently the Mg alloy disc was pressed in so as to be completely embedded in the thickness direction, and then the surface was polished. Thus, a disc specimen having a metal exposed surface (Mg alloy) was produced.

Similarly to this, the Cu alloy disc was disposed to be superposed on a resin cut into a disc form, subsequently the Cu alloy disc was pressed in so as to be completely embedded in the thickness direction, and then the surface was polished. Thus, a disc specimen (Cu) was produced.

Furthermore, the Al alloy disc was disposed to be superposed on a resin cut into a disc form, subsequently the Al alloy disc was pressed in so as to be completely embedded in the thickness direction, and then the surface was polished. Thus, a disc specimen (Al) was produced.

Furthermore, the Fe alloy disc was disposed to be superposed on a resin cut into a disc form, subsequently the Fe alloy disc was pressed in so as to be completely embedded in the thickness direction, and then the surface was polished. Thus, a disc specimen (Fe) was produced.

Production of Specimens (Mg, Cu, Al, Fe) of Example 7

Similarly to (Production of specimen of Example 7 (spin)), a disc specimen (Mg alloy) was produced, and then a film was formed according to a spin coating method (for 15 seconds at 1000 rpm, and subsequently for 30 seconds at 2500 rpm). This was subjected to a heating and drying treatment at 60° C., and thereby a specimen (Mg alloy) of Example 7 was produced. This is a sample produced in order to investigate the dependency on metal material, and is an object identical to the specimen of Example 7 (spin).

A specimen (Cu) of Example 7 was produced in the same manner as in (Production of specimen of Example 7 (spin)), except that the disc specimen (Cu) was used.

A specimen (Al) of Example 7 was produced in the same manner as in (Production of specimen of Example 7 (spin)), except that the disc specimen (Al) was used.

A specimen (Fe) of Example 7 was produced in the same manner as in (Production of specimen of Example 7 (spin)), except that the disc specimen (Fe) was used.

Next, the eight kinds of specimens described above were immersed in a 3.5 wt % NaCl solution for 1 to 7 days, and thereby a corrosion test was performed.

Figure 40:
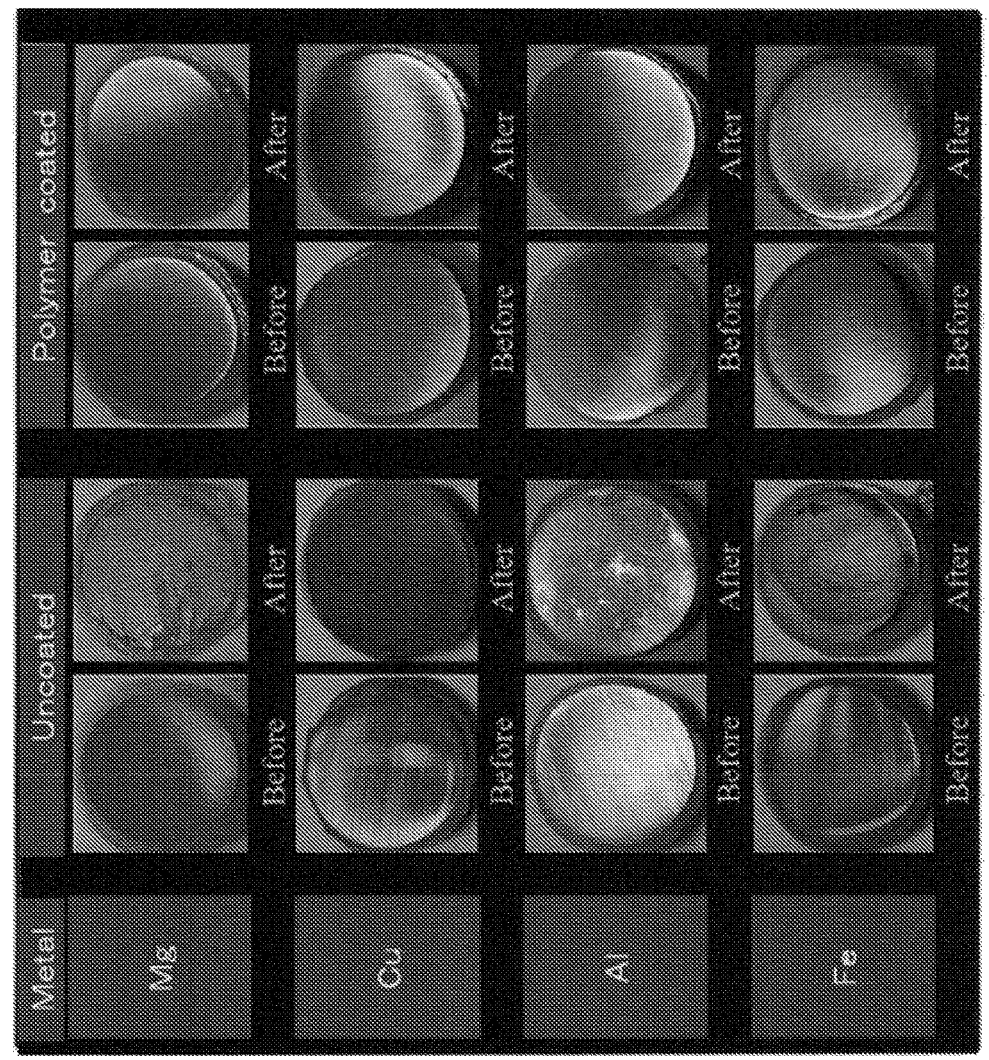
FIG. 40 shows photographs obtained before and after a corrosion test in the absence of a polymer film (Uncoated) and in the presence of a polymer film (Polymer-coated) for disc specimens of various main metals.

FIG. 40 shows photographs of various alloy or metal disc specimens provided in the state of being uncoated and in the state of being polymer-coated, which were obtained before and after a corrosion test.

The photographs of Uncoated-Before in FIG. 40 are photographs obtained immediately after the production of various alloy or metal disc specimens, and before a corrosion test. The photographs of Polymer coated-Before are photographs obtained immediately after the production of specimens of various alloys or metals coated with polymer films, and before a corrosion test.

The photographs of Uncoated-After in FIG. 40 are optical photographs obtained after a corrosion test of various alloy or metal disc specimens. The photographs of Polymer coated-After are optical photographs obtained after a corrosion test of specimens of various alloys or metals coated with polymer films.

In all of the specimens of Uncoated, the exposed surfaces of various alloys or metals were corroded. On the other hand, in all of the specimens of Polymer coated, the surfaces did not corrode.

(Electrochemical Corrosion Test)

Next, an electrochemical corrosion test was performed by the method illustrated in the explanatory diagram for an electrochemical corrosion test described above (FIG. 37).

First, four samples of Uncoated, doma-mma coated specimen of Example 7, doma-hma coated specimen of Example 11, and doma-dma coated specimen of Example 12 were prepared using disc specimens (Al).

Next, specimen electrode units were produced by insulating surfaces other than the measurement surface in each sample.

Each of the specimen electrode units was immersed in a liquid electrolyte (3.5 wt % NaCl solution) contained in a vessel, together with a reference electrode (R.E.) and a counter electrode (C.E.). The respective electrodes were connected to a potentio-galvanostat (not shown in the diagram) through wiring.

As disclosed in the explanatory diagram, after the specimen electrode unit was attached, the system was left to stand for 10 minutes, and the corrosion current was measured from the spontaneous potential by linear sweep voltammetry (L.S.V.) at a scan rate of 1 mV/sec.

Figure 41:
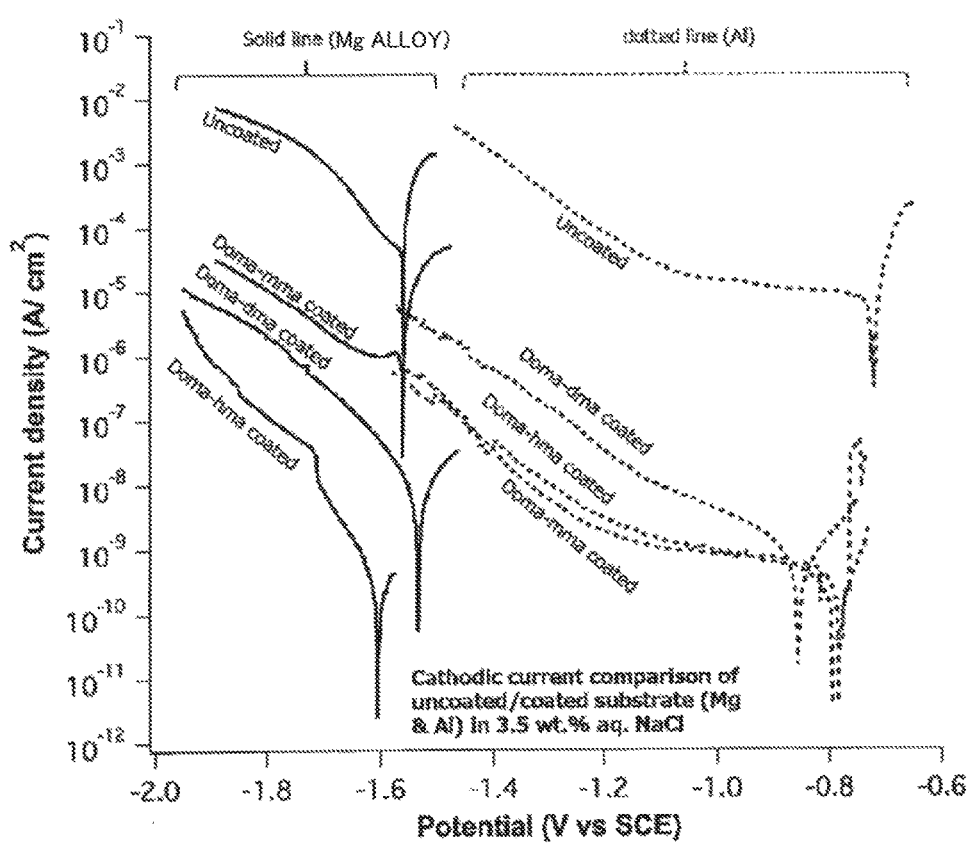
FIG. 41 is a graph illustrating the results of an electrochemical corrosion test for the uncoated, doma-mma coated, doma-hma coated, and doma-dma coated samples, the graph representing the V-I characteristics in a 3.5 wt % NaCl solution. The solid line represents the results obtained by using a Mg alloy as the substrate, and the dotted line represents the results obtained by using Al as the substrate.

FIG. 41 is a graph presenting the results of an electrochemical corrosion test for the samples of Uncoated, doma-mma coated specimen of Example 7, doma-hma coated specimen of Example 11, and doma-dma coated specimen of Example 12, the graph showing the V-I (cathodic current) characteristics in a 3.5 wt % NaCl solution (dotted line in FIG. 41).

Meanwhile, for a comparison between metals, the results obtained in the case of using a Mg alloy as shown in FIG. 38 are also presented together (solid line in FIG. 41).

Similarly to the case of using a Mg alloy, also in the case of using Al, $H_2O$ was electrolyzed at the metal surface in the Uncoated sample, electrons were taken in the electrode, and a large current flowed. On the other hand, in the coated specimen, no significant current flowed through the specimen, and the electrolysis reaction of $H_2O$ was suppressed.

The results obtained as described above were summarized.

Table 4 is a table presenting the differences in the characteristics depending on the alloy or metal.

Here, the term $E_{corr}$ represents (corrosion potential), and the term $i_{corr}$ represents (corrosion current).

TABLE 4

| Metal | Condition | $E_{corr}$(V) | $i_{corr}$(μA/cm$^2$) |
|---|---|---|---|
| Mg alloy | Uncoated | −1.56 | 50.2 |
| | Doma-mma | −1.56 | 11.3 × 10$^{-2}$ |
| | Doma-hma | −1.60 | 17.1 × 10$^{-5}$ |
| | Doma-dma | −1.53 | 39.1 × 10$^{-4}$ |
| Al | Uncoated | −0.72 | 4.62 |
| | Doma-mma | −0.79 | 2.21 × 10$^{-4}$ |
| | Doma-hma | −0.80 | 1.59 × 10$^{-4}$ |
| | Doma-dma | −0.86 | 2.57 × 10$^{-4}$ |

Example 14

(Material Preparation and Evaluation of Characteristics)

A sample of Example 14 was produced in the same manner as in the case of the sample of Example 5, except that the time of the free radical polymerization reaction represented by chemical reaction scheme (10) was set to 24 hours.

Figure 42:
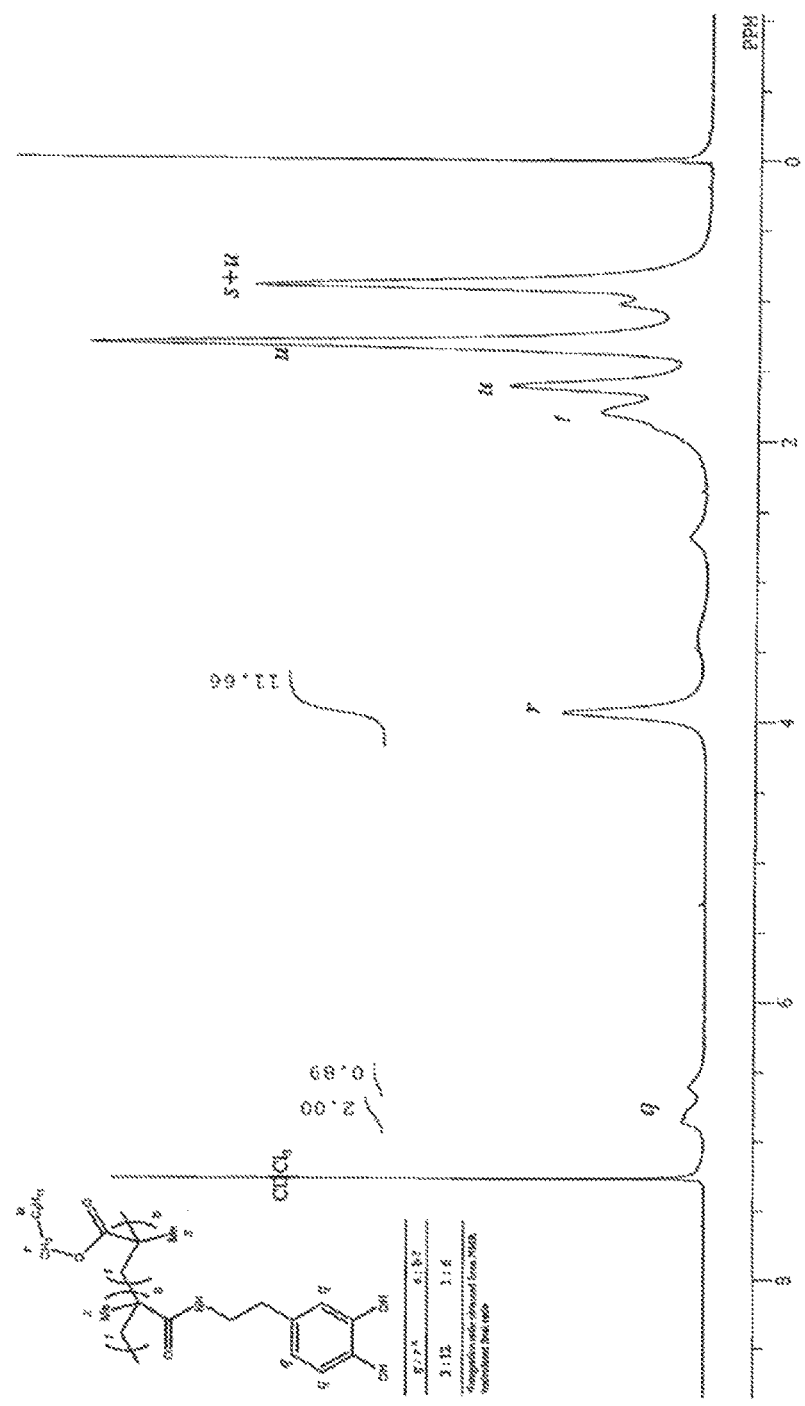
FIG. 42 is a graph illustrating the results of a 1H NMR analysis for the sample of Example 14.

FIG. 42 shows the results of a 1H NMR analysis for the sample of Example 14.

The ratio m:n of the sample of Example 14 was 1:6. Furthermore, the yield of the polymerization reaction was 61%.

Figure 43:
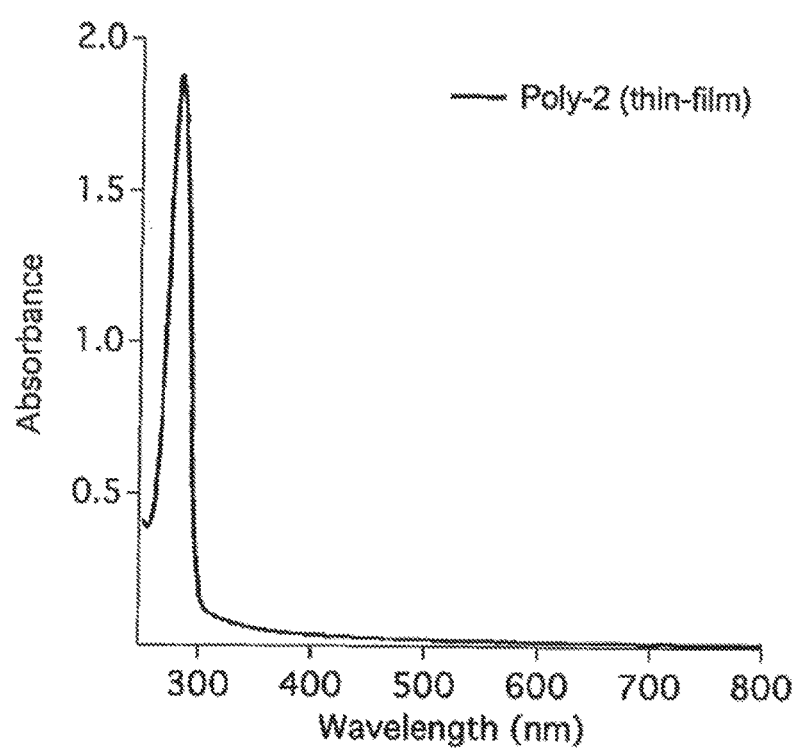
FIG. 43 is a UV-V spectral diagram for the coating film of the sample of Example 14 on a quartz substrate.

Furthermore, a dispersion liquid of the sample of Example 14 was spin coated on a quartz substrate in the same manner as in the production example of the specimen of Example 1 described above, and the UV-V spectrum was obtained. FIG. 43 shows the analytic spectrum of this case. No peak was observed in the wavelength range of 400 nm to 700 nm, and it was confirmed that the coating film was transparent.

(Scotch Tape Test)

A glass substrate and a Mg substrate were respectively subjected to a coating treatment as described above, using the sample of Example 14.

Figure 44:
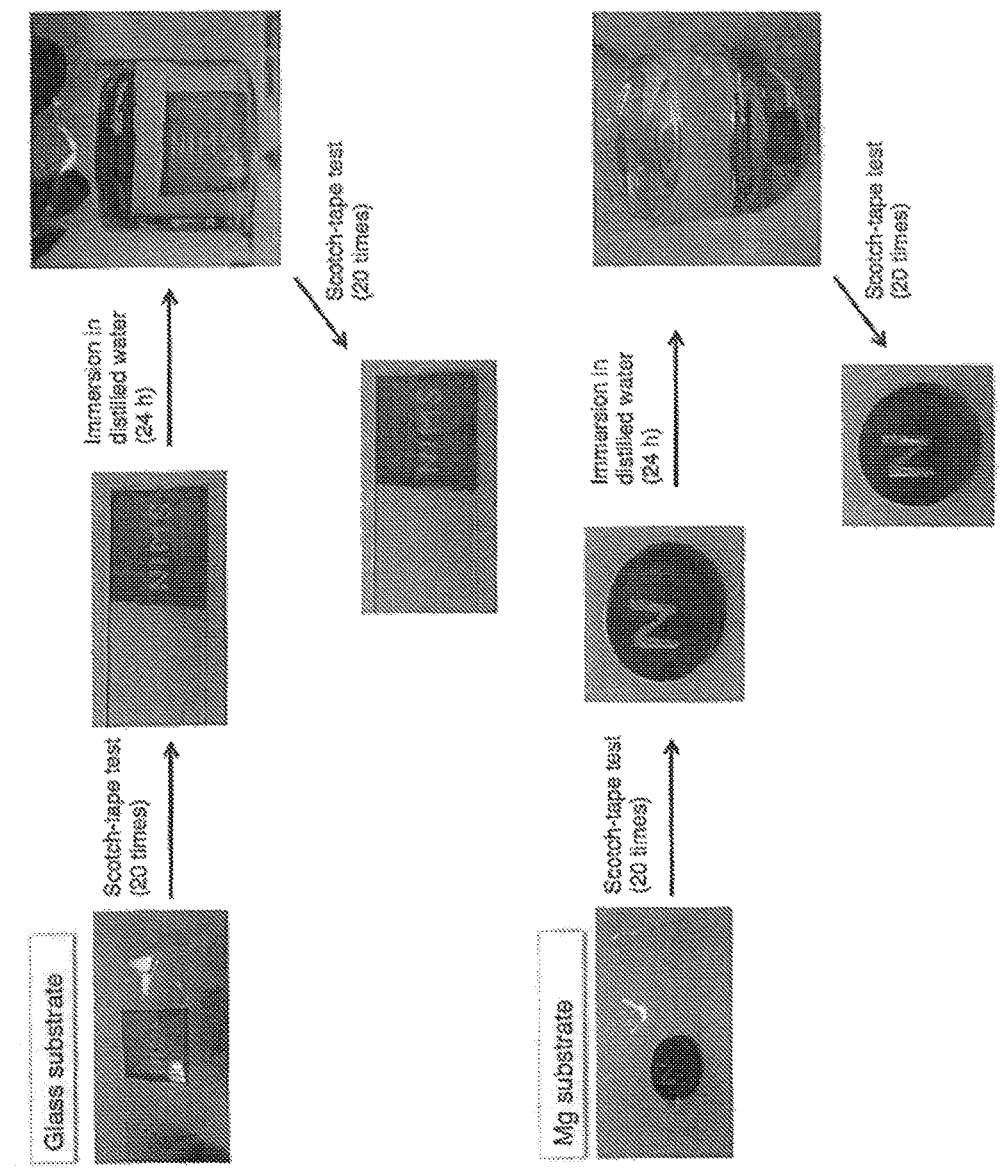
FIG. 44 is a photographic diagram showing the results of a Scotch tape test for the coating film of the sample of Example 14.

Furthermore, for a comparison, a specimen provided only a coating of PMMA only was also prepared. FIG. 44 presents the results of a Scotch tape test for a specimen produced by adding a trace amount of Rhodamine B dye to the sample of Example 14 and then performing coating. Characters "NIMS" and "N" represent the same meanings as previously described. According to the test results, it was confirmed that after 20 times of the Scotch tape test, immersion in distilled water for 24 hours, and further 20 times of the Scotch tape test, detachment of the coating film did not occur.

Figure 45:
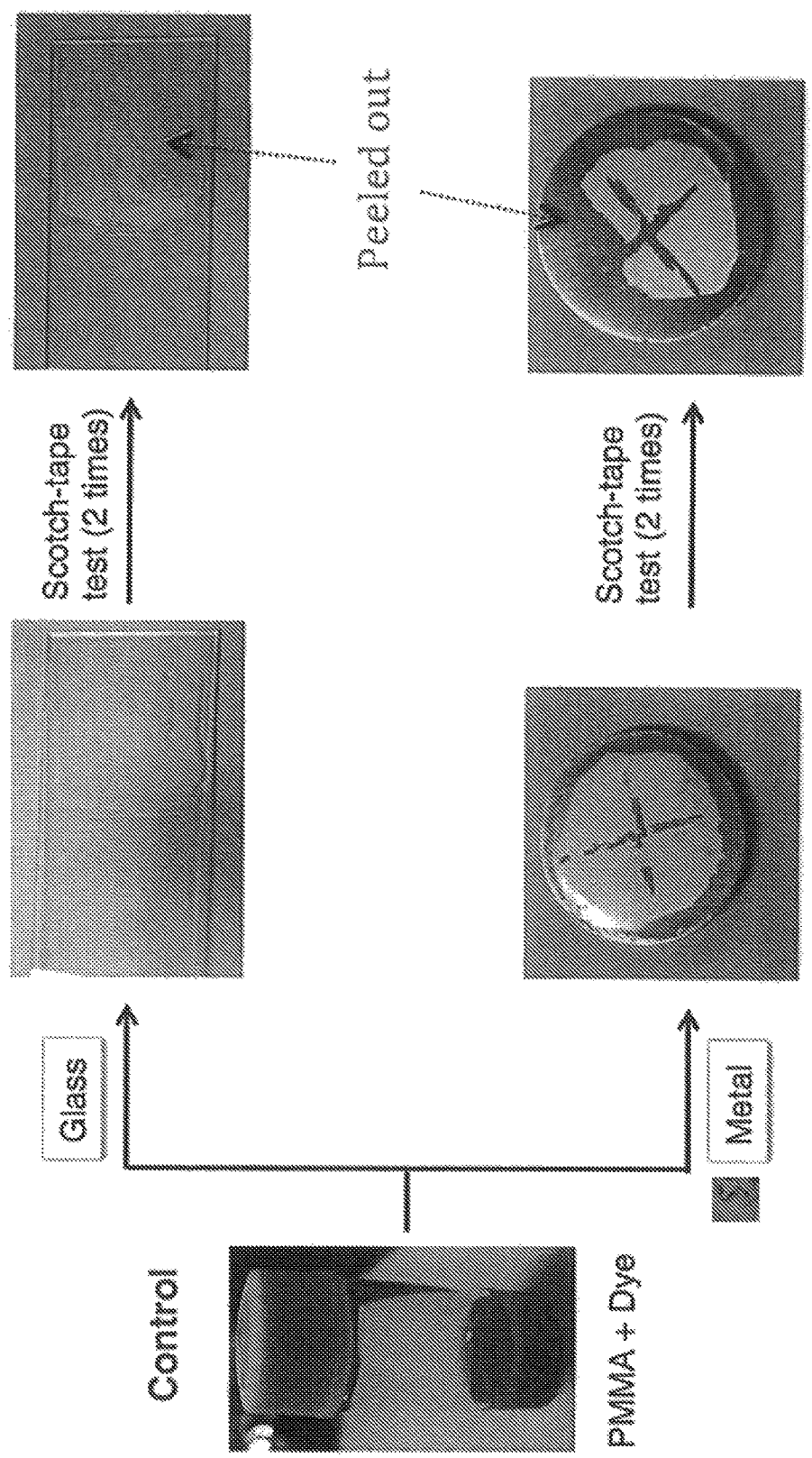
FIG. 45 is a photographic diagram showing the results of a Scotch tape test for a PMMA coating film as a Comparative Example.

On the other hand, in the case of the PMMA coating of Comparative Examples, as shown in FIG. 45, it can be seen that detachment occurred only after 2 times of the Scotch tape test.

Figure 46:
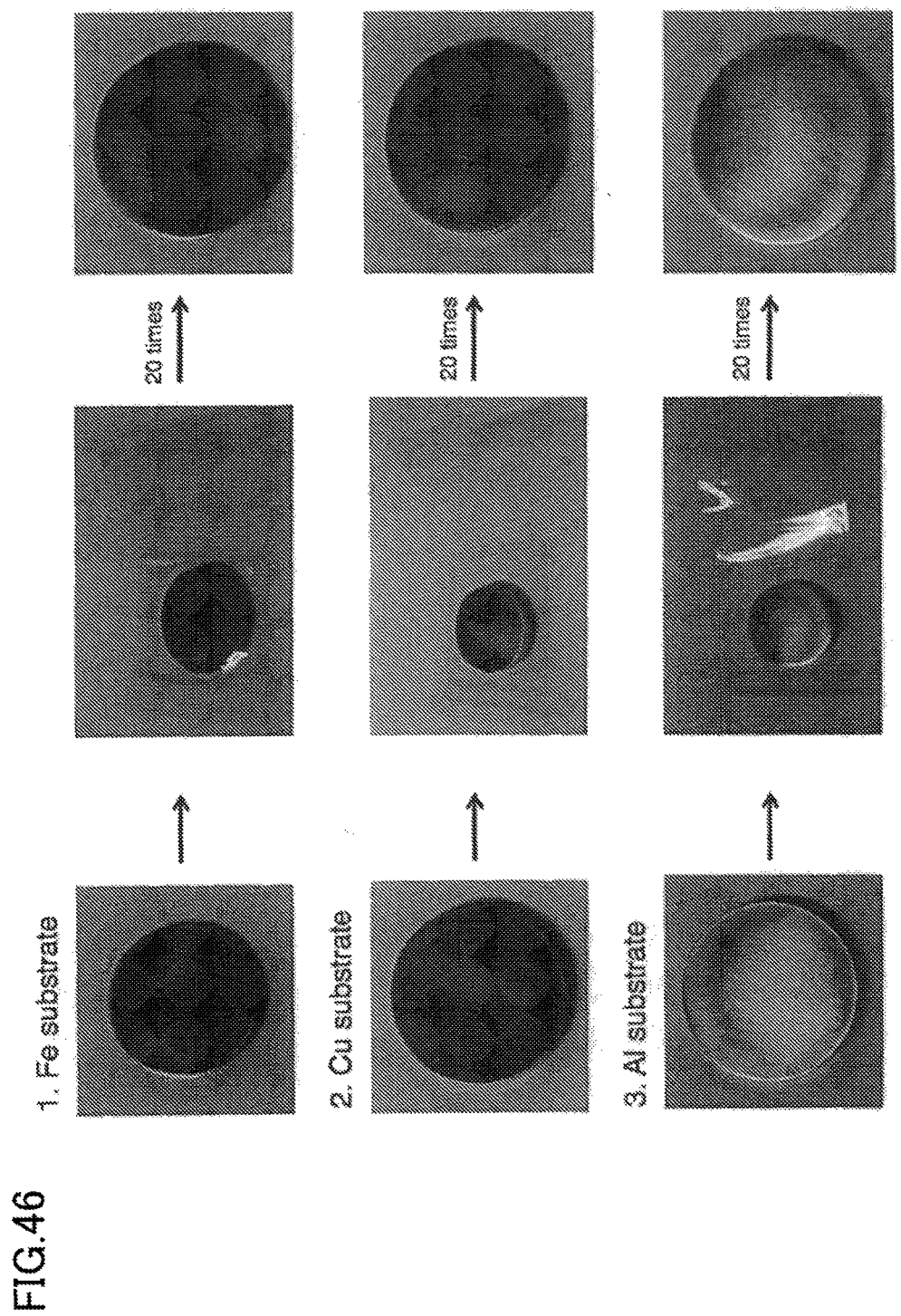
FIG. 46 is a photographic diagram showing the results of a Scotch tape test for various substrates of the samples of Example 14.

Furthermore, FIG. 46 presents the results of a Scotch tape test obtained in a case in which the sample of Example 14 was used to provide coating on different substrates (Fe, Cu, and Al). It was found that in all cases, detachment of the coating film did not occur even after 20 times of the Scotch tape test.

(Contact Angle Test)

The static water contact angles were measured in a case in which coating films were formed using the sample of Example 14 on glass substrates, the coated substrates were immersed in aqueous solutions at different pH's, and then the substrates were washed with distilled water and dried under $N_2$ gas float.

The pH conditions were adjusted using 1 M HCl for pH 1 and pH 3; using Tris buffer for pH 9; and using 1 M NaOH for pH 11.

Figure 47:
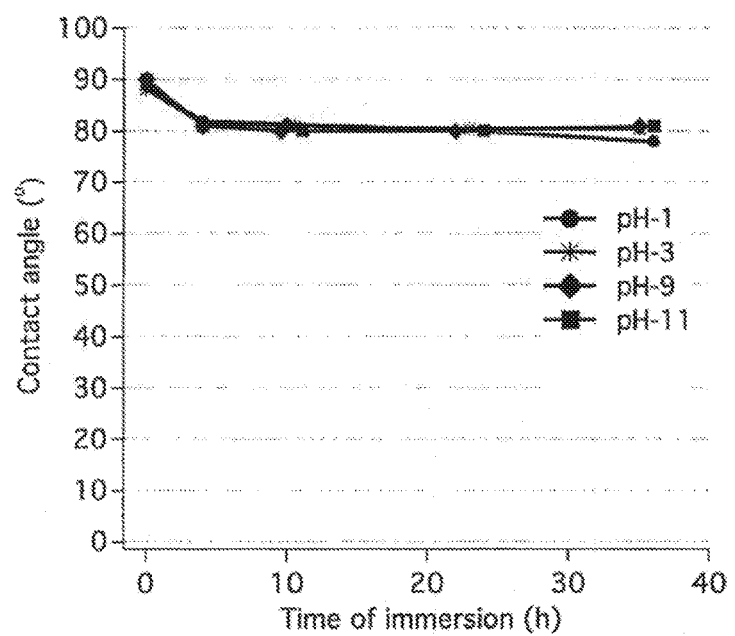
FIG. 47 is a graph illustrating the static water contact angle after immersion o the sample of Example 14 in aqueous solutions at various pH's.

The relations between the contact angle and the immersion time are shown in FIG. 47. It was confirmed that there was no significant change in the water contact angle of the coating film as a result of immersion at different pH's.

Example 15

(Material Preparation and Evaluation of Physical Properties)

The results obtained by setting the time for the free radical polymerization reactions represented by chemical reaction schemes (9), (10), and (11) to 24 hours, and setting the amount of use of AIBN to 1 mol %, are presented in Table 5. Polymerization reactions were carried out.

Six kinds of polymers were obtained as the sample of Example 15. Meanwhile, the term poly2 in Table 5 represents the sample of Example 14.

For these samples, Table 6 presents the average molecular weight, mass percent (%) of DOMA unit, and Tg (° C.).

TABLE 5

| Polymer | x:y (feed ratio)[a] | m:n[b] | Yield (%) |
|---|---|---|---|
| Poly 1A | 1:5 | 1:7 | 71 |
| Poly 1B | 1:10 | 1:14 | 84 |
| Poly 1C | 1:30 | 1:33 | 89 |
| Poly 1D | 1:90 | 1:100 | 81 |
| Poly 2 | 1:2 | 1:6 | 61 |
| Poly 3 | 1:3 | 1:12 | 62 |

[a]Initial molar ratio,
[b]calculated from $^1$H NMR

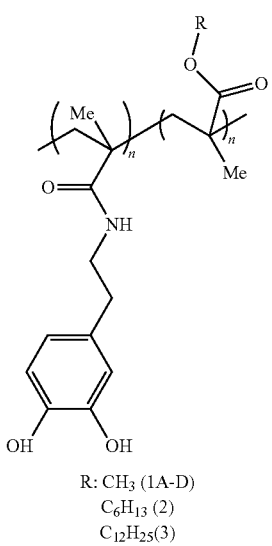

R: CH₃ (1A-D)
C₆H₁₃ (2)
C₁₂H₂₅ (3)

TABLE 6

| | poly(DOMA-co-AMA) | | | |
|---|---|---|---|---|
| Name | $M_w$ [g/mol], (PDI) | a:b | DOMA unit wt % | $T_g$ (° C.) |
| Poly 1A (x = 1) | 20,000 (1.97) | 1:7 | 24 | 127 |
| Poly 1B (x = 1) | 34,000 (2.23) | 1:14 | 14 | 125 |
| Poly 1C (x = 1) | 44,000 (2.40) | 1:33 | 6 | 115 |
| Poly 1D (x = 1) | 111,000 (2.70) | 1:100 | 2 | 115 |
| Poly 2 (x = 6) | 24,000 (1.67) | 1:6 | 18 | 60 |
| Poly 3 (x = 12) | 43,000 (1.65) | 1:12 | 10 | — |

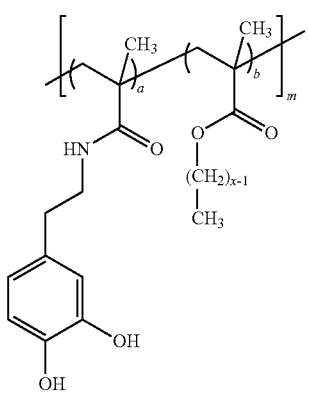

Figure 48:
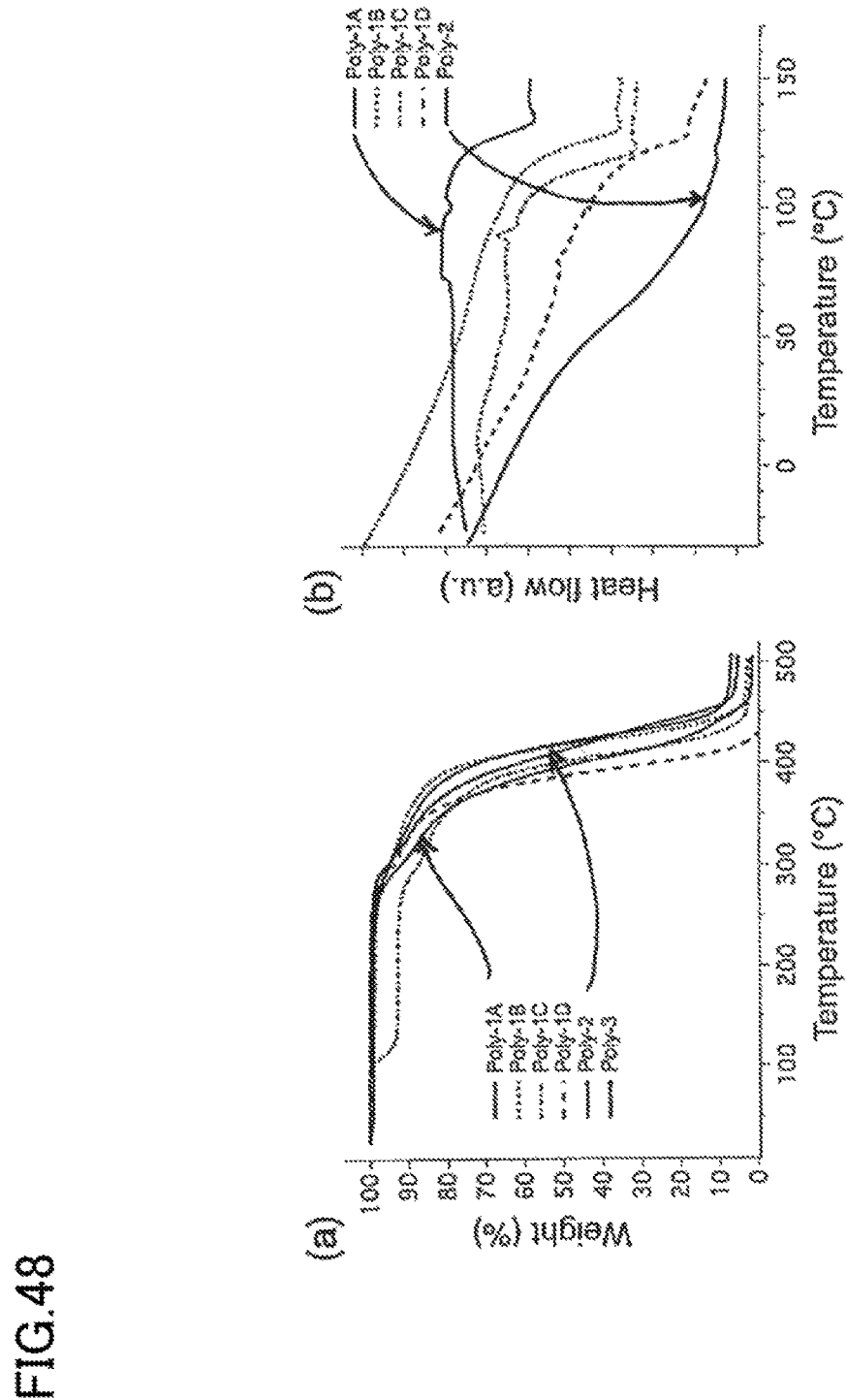
FIGS. 48(a) and 48(b) show diagrams showing (a) a comparison of the TGA curve and (b) a DSC thermogram for the sample of Example 15.
Figure 49:
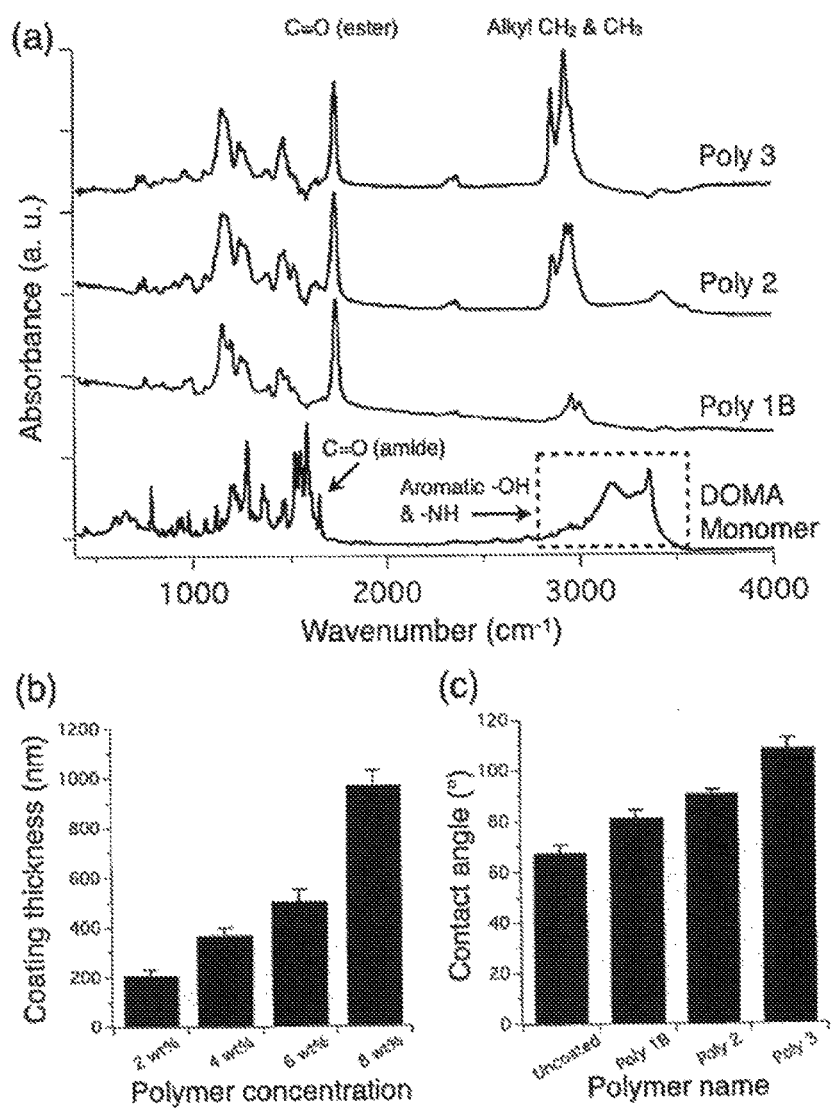
FIGS. 49(a) to 49(c) show diagrams representing (a) FT-IR spectrum, (b) relations between the polymer concentration and the film thickness, and (c) water contact angle, for the sample of Example 15.

FIGS. 48(a) and 48(b) present the respective (a) TGA curves and (b) DSC thermograms (second heating cycle) of these samples. FIGS. 49(a) to 49(c) present (a) a comparison of the FT-IR spectra; (b) the relations between the polymer concentration measured by a surface profiler, and the thickness of the coating film; and the (c) static water contact angles.

Example 16

(1) Synthesis of P(DOMA-DMAEMA)

N-(3,4-dihydroxyphenethyl) methacrylamide (DOMA) and 2-(dimethylamino)ethyl methacrylate (DMAEMA) were synthesized by free radical polymerization using azoisobutyronitrile (AIBN). A 100-ml two-necked flask was charged with a DOMA monomer (444 mg, 2 mM) and AIBN (3 mol %), and the flask was purged three times with argon gas for 30 minutes. 15 ml of dehydrated dimethylformamide (DMF) was added to the flask, and the mixture was stirred with a stirrer bar. This mixed solution was purged with argon gas for 30 minutes, and then DMAEMA (1.57 g, 10 mM) was added thereto using a syringe. Argon purging was performed for another 10 minutes, and then the flask was placed in an oil bath at 75° C. The mixture therein was stirred for 18 hours. Subsequently, the reaction solution was cooled to room temperature, and DMF was removed under reduced pressure. A product thus obtained was dissolved in methanol and was subjected to reprecipitation with petroleum ether. A precipitate thus obtained was stirred for 2 to 3 hours in the state as received, and the supernatant was removed by decantation. In order to further remove monomer components, the process of reprecipitation was repeated three times. The final product was obtained in the form of a polymer as a white powder. Furthermore, the polymer was dissolved in methanol, and the solution was dialyzed using a dialysis membrane having a cut-off molecular weight of 2,000 Da. Subsequently, the polymer thus obtained was dried (yield 1.86 g).

(2) Synthesis of P(DOMA-PEGMA)

Dopamine methacrylamide (DOMA) and poly(ethylene glycol) monomethyl ether methacrylate (PEGMA) were synthesized by free radical polymerization using AIBN. A 100-ml two-necked flask was charged with DOMA monomer (444 mg, 2 mM) and AIBN (3 mol %), and the mixture was purged three times with argon for 30 minutes. Subsequently, 15 ml of dehydrated dimethylformamide (DMF) was added to the reaction vessel. The reaction solution was purged with argon gas for 30 minutes, and PEGMA (3 g, 6.32 mM) was added thereto using a syringe. Subsequently, argon purging was continued for 15 minutes, the mixture was allowed to react for 18 hours in an oil bath at 75° C., and then the reaction mixed liquid was cooled to room temperature. The reaction solution thus obtained was concentrated and was reprecipitated by adding the reaction solution into diethyl ether. The precipitate was stirred for 2 to 3 hours, the supernatant was removed by decantation, and then reprecipitation was performed again with diethyl ether. A product thus obtained was obtained as a viscous gel (yield 3.88 g).

REFERENCE SIGNS LIST

11 Nano-Coating Film
12 Substrate

The invention claimed is:
1. A nano-coating material; capable of being bonded to the surface of a metal or an alloy substrate,
    the nano-coating material comprising a compound having, in a polymer main chain,
    (A) a first side chain or a terminal, each having a binding group containing a benzene ring having at least one pair of adjacent hydroxyl groups; and
    (B) a functional second side chain,
    wherein the nano-coating material is hydrophobic, and
    wherein the polymer main chain has a ratio between the first side chain and the second side chain of from 1:33 to 1:100.
2. The nano-coating material according to claim 1, wherein the second side chain is hydrophobic.

3. The nano-coating material according to claim 1, wherein the polymer main chain is a polymer chain comprising carbon (C) single bonds.

4. The nano-coating material according to claim 1, wherein the polymer main chain is formed from a copolymer of acrylamide and an acrylate.

5. The nano-coating material according to claim 1, wherein the binding group of the first side chain includes a catechol group.

6. The nano-coating material according to claim 1, wherein the second side chain has an alkyl group having a number of carbon atoms (C) of from 1 to 12.

7. The nano-coating material according to claim 1, wherein the second side chain has a functional group containing a benzene ring.

8. The nano-coating material according to claim 1, wherein the polymer main chain has a ratio between the first side chain and the second side chain of 1:33.

9. A method for producing the nano-coating material capable of being bonded to the surface of a metal or an alloy of claim 1, the method comprising:
a polymerization step for polymerizing a first monomer having a binding group containing a benzene ring having at least one pair of adjacent hydroxyl groups, and a second monomer having a hydrophobic group, wherein the nano-coating material is hydrophobic.

10. The method for producing a nano-coating material according to claim 9, wherein the first monomer has an acrylamide group.

11. The method for producing a nano-coating material according to claim 10, wherein the acrylamide group has a hydroxyl group or an alkyl group having a number of carbon atoms (C) of from 1 to 12.

12. The method for producing a nano-coating material according to claim 9, wherein the second monomer has a methacrylate group.

13. The method for producing a nano-coating material according to claim 12, wherein the methacrylate group has a hydroxyl group or an alkyl group having a number of carbon atoms (C) of from 1 to 12.

14. The method for producing a nano-coating material according to claim 9, wherein the hydrophobic group includes an alkyl group having a number of carbon atoms (C) of from 1 to 12, or a benzene ring.

15. The method for producing a nano-coating material according to claim 9, wherein in the polymerization step, the first monomer and the second monomer are polymerized by a heated reaction using AIBN as a polymerization initiator.

16. A coating agent for a substrate formed from a metal or an alloy, the coating agent comprising the nano-coating material according to claim 1.

17. A functional material, comprising the nano-coating material according to claim 1 bonded to the surface of a substrate formed from a metal or an alloy.

18. The functional material according to claim 17, wherein a nano-coating film is formed on the surface of the substrate through bonding of the nano-coating material, and the film thickness of the nano-coating film is 100 nm or more and less than 1 μm.

19. The functional material according to claim 17, wherein a static water contact angle of a film formed of the nano-coating material is more than 80°.

20. A method for producing a functional material, the method comprising:
a step of dispersing the nano-coating material according to claim 1 in an organic solvent, and preparing a nano-coating material dispersion liquid; and
a step of applying the nano-coating material dispersion liquid on a substrate surface by a wet coating method, subsequently drying the dispersion liquid, and thereby bonding the nano-coating material to the substrate surface.

* * * * *